United States Patent
Komatsu

(10) Patent No.: US 8,307,420 B2
(45) Date of Patent: *Nov. 6, 2012

(54) SECURITY GATEWAY SYSTEM, METHOD AND PROGRAM FOR SAME

(75) Inventor: Satoshi Komatsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 12/597,077

(22) PCT Filed: Apr. 17, 2008

(86) PCT No.: PCT/JP2008/001018
§ 371 (c)(1),
(2), (4) Date: Apr. 2, 2010

(87) PCT Pub. No.: WO2008/132821
PCT Pub. Date: Nov. 6, 2008

(65) Prior Publication Data
US 2010/0192216 A1 Jul. 29, 2010

(30) Foreign Application Priority Data

Apr. 23, 2007 (JP) .................. 2007-113546

(51) Int. Cl.
*G06F 21/20* (2006.01)
(52) U.S. Cl. ........................................ 726/12
(58) Field of Classification Search ............. 726/12; 709/249
See application file for complete search history.

(56) References Cited

U.S. PATENT DOCUMENTS
6,212,633 B1 * 4/2001 Levy et al. .................. 713/153
(Continued)

FOREIGN PATENT DOCUMENTS
JP 2000-172597 A 6/2000
(Continued)

OTHER PUBLICATIONS

Masashi Yamane, "IT Kanrisha no Tameno Kasoka Gijutsu Nyumon (Zenpen) '2. Kasoka Gijutsu no Jitsugen Level to Kadai'", [online], [retrieval date Jun. 19, 2008], Atmark IT (@IT), Apr. 6, 2004, Internet <URL:http://www.atmarkit.co.jp/fsys/special/012virtualization/virtualization02.html>.

(Continued)

*Primary Examiner* — Krisna Lim
(74) *Attorney, Agent, or Firm* — Foley & Lardner LLP

(57) ABSTRACT

A non-secure network gateway 11 and a secure network gateway 12 are individually realized as virtual machines constructed on a physical hardware unit of a real machine, and are connected, by standard protocol communication portions 20 and 25, to a non-secure network 1 and a secure network 2 using a standard protocol the standardized specifications of which have been published. Data exchange between non-standard protocol communication portions 22 and 23 of the sub-gateways 11 and 12 is performed using a nonstandard protocol the specifications of which have not been published, and data exchange between the nonstandard side and the standard side is performed only in the application layer. Protocol conversion portions 21 and 24 refers to relay permission settings tables 30 and 31 to confirm relay permission for communication data, and perform protocol conversion only when relaying is permitted. Even in the event that illicit communication data from one network has penetrated into a gateway, penetration of the communication data into the other network can be prevented.

10 Claims, 19 Drawing Sheets

U.S. PATENT DOCUMENTS

| | | | |
|---|---|---|---|
| 6,463,465 | B1 | 10/2002 | Nieuwejaar |
| 7,949,871 | B2 * | 5/2011 | Randle et al. ............ 713/153 |
| 8,079,059 | B1 * | 12/2011 | Lee .......................... 726/1 |
| 8,108,679 | B2 * | 1/2012 | Wiseman .................. 713/176 |
| 2002/0126678 | A1 | 9/2002 | Kelly et al. |
| 2003/0058884 | A1 | 3/2003 | Kallner et al. |
| 2003/0149895 | A1 | 8/2003 | Choo et al. |
| 2006/0075478 | A1 | 4/2006 | Hyndman et al. |
| 2006/0248205 | A1 * | 11/2006 | Randle et al. ............ 709/229 |
| 2007/0255852 | A1 * | 11/2007 | McBride et al. .......... 709/246 |
| 2009/0064308 | A1 * | 3/2009 | Komatsu ................... 726/12 |
| 2010/0241748 | A1 * | 9/2010 | Ansari et al. ............ 709/225 |

FOREIGN PATENT DOCUMENTS

| | | |
|---|---|---|
| JP | 2004-535611 T | 11/2004 |
| JP | 2006-295649 A | 10/2006 |
| JP | 2007-274410 A | 10/2007 |
| WO | WO 02/061552 A1 | 8/2002 |

OTHER PUBLICATIONS

Yoichiro Hata, "Kasoka Sofuto wa Kieteiku", [online], [retrieval date Jun. 19, 2008], Nikkei Linux, Oct. 13, 2006, Internet <URL:http://itpro.nikkeibp.co.jp/article/OPINION/20061011/250354/>.

"Naibu kara no Kogeki mo Mamoreru 'IDS'", Network Magazine, Feb. 1, 2003, vol. 8, No. 2, pp. 72 to 75, particularly, p. 72, 'IDS tte Nani?, p. 75, left column, lines 3 to 6, Fig. 2.

"Fusei Shinnyu Kenchi System (IDS) towa?", Network Magazine, Apr. 1, 2002, vol. 7, No. 4, pp. 56 to 59, particularly, p. 56, 'IDS wa Kanshi Camera', p. 58, 'Taisho wa Jidoka mo Dekiru', Fig. 3.

Douglas Corner, "Internetworking TCP/IP, vol. 1, Principles, Protocols and Architecture", translated by Jun Murai and Hiroyuki Kusumoto, Kyoritsu Shuppan Co., Ltd, ISBN4-320-02667-5.

Takashi Takeshita, Kimiyasu Murayama, Toru Arai and Yukio Karita, "Introduction to Mastering TCP/IP, Second edition", Ohmsha, Ltd., Development Bureau, ISBN4-274-06257-0.

"Intrusion Detection System" http://eazyfox.homelinux.org/Security/Security05.html.

Ken Matsumoto, "Evaluation Point When Introducing Server Virtualization Technology" Nomura Research Institute, Ltd., http://www.nri.co.jp/opinion/g_souhatsu/pdf/gs20050104.pdf.

Haruo Motoazabu, "What is Intel's Virtualization Technology {Vanderpool Technology}", IT Media Inc., http://www.atmarkit.co.jp/fsys/kaisetsu/054vanderpool/vanderpool.html.

Daichi Goto, "Linux World Expo/Tokyo 2005—Linux and Latest Server Virtualization Technology", MYCOM Journal, Mainichi Communications Inc.

Hiroshi Morita, "Trend and Future of Virtualization Technology", Japan Hewlett-Packard Japan Ltd., IMPRESS Think-IT, http://www.thinkit.co.jp/free/tech/29/3/1.html.

S. Komatsu, U.S. PTO Office Action, U.S. Appl. No. 11/911,255, dated Dec. 12, 2011, 20 pages.

S. Komatsu, U.S. PTO Office Action, U.S. Appl. No. 11/911,255, dated Aug. 29, 2011, 25 pages.

* cited by examiner

FIG. 8

|   | TRANSMISSION SOURCE PERMISSION INFORMATION | | | DESTINATION PERMISSION INFORMATION | |
|---|---|---|---|---|---|
|   | PROTOCOL NO. | PORT NO. | TRANSMISSION SOURCE ADDRESS | PORT NO. | DESTINATION ADDRESS |
| 1 | 1 | 2 | AAA, BBB, CCC, DDD | 2 | EEE, FFF, GGG, HHH |
| 2 | 24 | * | *,*,*,* | * | *,*,*,* |
| 3 | 53 | * | *,*,*,* | * | *,*,*,* |
| 4 | ** | * | *,*,*,* | * | *,*,*,* |
| 5 | ** | * | *,*,*,* | * | *,*,*,* |
| ⋮ | ⋮ | ⋮ | ⋮ | ⋮ | ⋮ |

FIG. 9

|   | TRANSMISSION SOURCE PERMISSION INFORMATION | | | DESTINATION PERMISSION INFORMATION | |
|---|---|---|---|---|---|
|   | PROTOCOL NO. | PORT NO. | TRANSMISSION SOURCE ADDRESS | PORT NO. | DESTINATION ADDRESS |
| 1 | 1 | 2 | EEE, FFF, GGG, HHH | 2 | WWW, XXX, YYY, ZZZ |
| 2 | 24 | * | *,*,*,* | * | *,*,*,* |
| 3 | 53 | * | *,*,*,* | * | *,*,*,* |
| 4 | ** | * | *,*,*,* | * | *,*,*,* |
| 5 | ** | * | *,*,*,* | * | *,*,*,* |
| ⋮ | ⋮ | ⋮ | ⋮ | ⋮ | ⋮ |

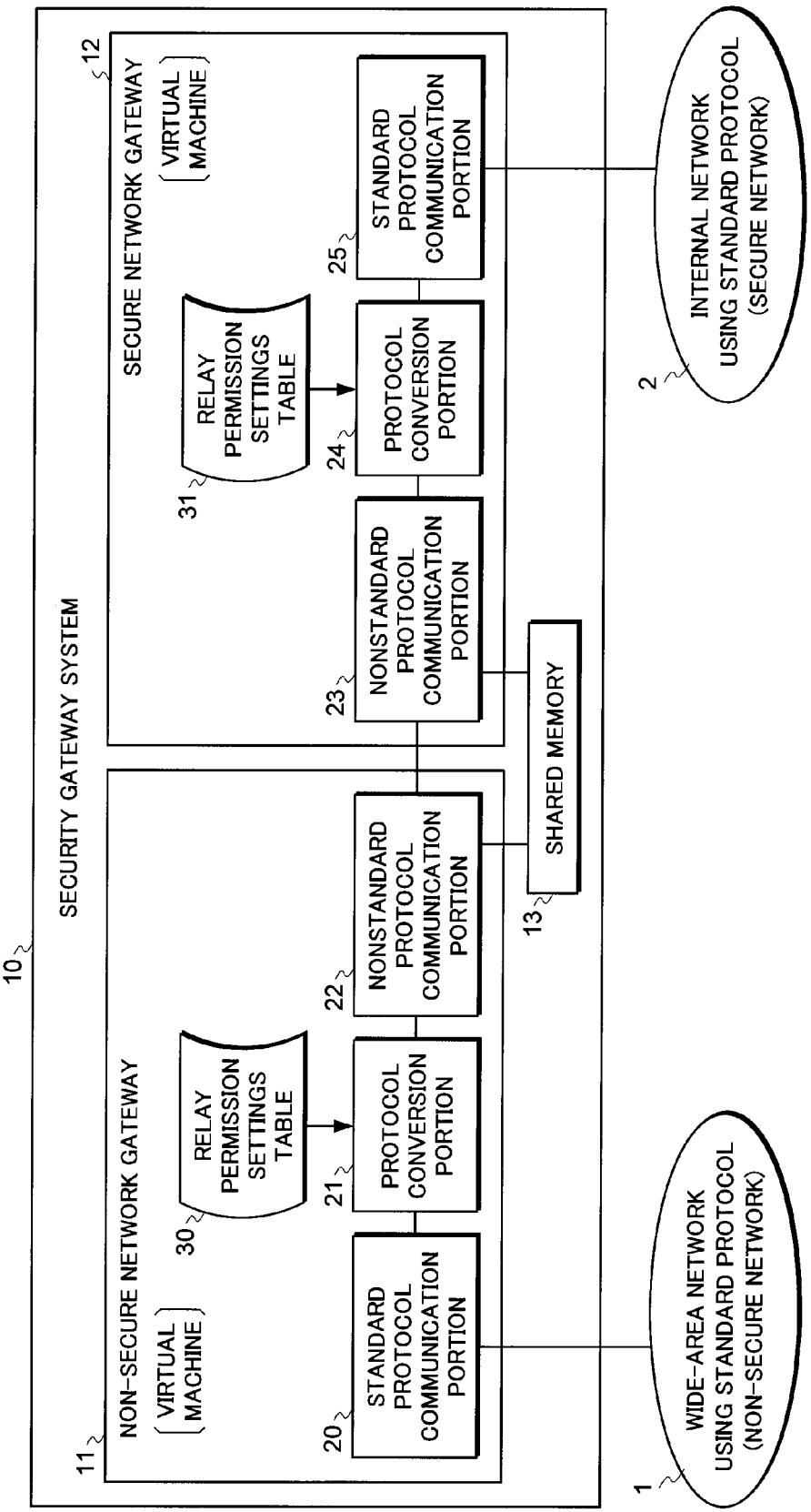

US 8,307,420 B2

SECURITY GATEWAY SYSTEM, METHOD AND PROGRAM FOR SAME

TECHNICAL FIELD

This invention relates to a security gateway system, which connects a plurality of networks each using a standard protocol the standardized specifications of which have been published, and a method and program for such a system.

BACKGROUND ART

In the field of network communication technology, by performing communications using the Internet protocol (IP) which is a de facto standard, services can be provided to the entire Internet from independent networks and specific groups using manufacturer-specific communication protocols, enabling provision of services to people around the world (for example, see Non-Patent Document 1).

This Internet protocol (IP) is an example of a protocol used in open systems interconnection; the specifications are published and can be obtained by anyone. Based on hardware and software for communication using this published specification, standardized Internet services are provided, and these also can be obtained and used by anyone (for example, see Non-Patent Documents 2 and 3).

When such circumstances, in which standardized means can be obtained by anyone to receive services, are applied to corporate activities and similar, there are dangers regarding consequences for confidentiality of communications and for corporate computer system security, and so numerous security methods to avoid such dangers have been devised and realized.

In general-use security equipment, security methods are adopted according to hierarchical communication layers used to achieve open systems interconnection.

In the Internet protocol (IP), communication is performed through the transmission and reception of data (packets) to which are appended original IP addresses assigned to communicating computers, protocol numbers, communication ports, and other information. In order to ensure security, a method is employed in which communication from computers which have not been permitted is blocked (packet filtering).

In this packet filtering, permitted IP addresses, protocol numbers, communication ports, and similar are set in devices (routers) which connect networks. A router then maintains security by deciding whether to pass data, based on permission setting information. However, packet filtering performed in the data link layer and the network layer, which are positioned at lower levels in open systems interconnections, have the drawback of a low level of security, due to the inability to set complicated conditions and execute control.

On the other hand, a firewall is a device which affords a higher level of security than do routers which interconnect networks. A firewall ensures security at a higher level than in open systems interconnections, in order to compensate for the drawbacks to security using IP filtering.

For example, one such firewall is a transport-level proxy, used to maintain security in the transport layer; as methods used in higher layers, there are application-level proxies which maintain security in the application layer and similar. Such application proxies are also called application gateways, and provide firewall functions which are the most intelligent and provide the highest level of security among proxy functions.

Non-Patent Document 4 shows a method that takes appropriate measures to protect company data or personal information from a threat on networks (computer crime, privacy problem) and to carry out appropriate company activities. The firewall as above is typical of such method.

When a firewall is installed at a connecting point of a company network which is connected to internet such that filtering of packet passing through the network or internet service to be provided is restricted, the company network can be protected from external threat.

Such firewall is constituted of computer and realized by processing of software (including firmware).

In general, an incompatibility is immanent in software, when security hole which uses the incompatibility for an evil purpose is discovered, not only function of a firewall is compromised, but also safety of a local area network is broken down. For this reason, a periodic maintenance is required (for example, see Non-Patent Document 5).

In addition, a firewall can only restrict passage of packet data, it is possible to protect against illicit attack from the outside, but difficult to prevent intrusion when permitting access from the outside. For this reason, Intrusion Detection System is used as a system for detecting intrusion separately from firewall. This intrusion detection system can detect an intrusion but can not defend against intrusion, so is often configured in the form of a combination in which a firewall is stopped when intrusion is detected (for example, see Non-Patent Document 6).

Patent Document 1: Japanese Patent Laid-open No. 2000-172597
Non-Patent Document 1: "Internetworking TCP/IP, Vol. 1, Principles, Protocols and Architecture", by Douglas Comer, translated by Jun Murai and Hiroyuki Kusumoto, Kyoritsu Shuppan Co., Ltd, ISBN4-320-02667-5
Non-Patent Document 2: "Hands-On TCP/IP", by Paul Simoneau, translated by Keisuke Tomaru, Nikkei Business Publications, Inc., ISBN4-8222-8037-3
Non-Patent Document 3: "Introduction to Mastering TCP/IP, Second edition", by Takashi Takeshita, Kimiyasu Murayama, Toru Arai and Yukio Karita, Ohmsha, Ltd., Development Bureau, ISBN4-274-06257-0
Non-Patent Document 4: "Intra & Internet Security" by Takahiro Sugimoto, Ohmsha, Ltd., Development Bureau, ISBN4-274-06162-0
Non-Patent Document 5: "New Battle against Security Hole", by Makoto Sengoku, Reiko Yagi and Hidekazu Takahashi, Nikkei Business Publications, Inc., Nikkei BYTE No. 7, Vol. 254, ISSNO289-6508
Non-Patent Document 6: "Intrusion Detection System" http://eazyfox.homelinux.org/Security/Security05.html
Non-Patent Document 7: "Evaluation Point When Introducing Server Virtualization Technology" by Ken Matsumoto, Nomura Research Institute, Ltd.
Non-Patent Document 8: "What is Intel's Virtualization Technology {Vanderpool Technology}" by Haruo Motoazabu, IT Media Inc.
Non-Patent Document 9: "Linux World Expo/Tokyo 2005—Linux and Latest Server Virtualization Technology" by Daichi Goto, MYCOM Journal, Mainichi Communications Inc.
Non-Patent Document 10: "Trend and Future of Virtualization Technology" by Hiroshi Morita, Japan Hewlett-Packard Japan Ltd., IMPRESS Think-IT.

However, in general, a firewall is a device constituted of a computer, operating system driving the computer and firewall software, and so is defenseless against software incompatibilities and against security threats which attempt to exploit newly discovered security holes. In particular, when a computer system is being protected solely by a firewall, if the firewall is breached the computer system is reduced to a completely defenseless state. For this reason, mechanisms for shutting out unknown threats remain indispensable to maintain the security of corporate infrastructures and other control systems of a highly public nature.

Moreover, constant maintenance is essential for firewalls and other security equipment in order to provide protective measures against newly discovered security holes and other threats. In general, software updates provided by security equipment manufacturers must be carried out to perform maintenance; the updates are themselves performed over the Internet, which is a public network. Thus a contradiction arises in which, despite the fact that a device is within a secure network, the device must be connected to the network which is must lacking in security (for example, see Non-Patent Document 5).

In Patent Document 1, a communication method is disclosed in which TCP/IP communication is performed using a LAN in a communication interface with an external network, with serial communication to an internal network performed via a protocol conversion server function. In Patent Document 1, security is maintained through various filtering in the relay process; however, should illicit communication data once penetrate the device, because a standardized protocol is being used, the devices which exist beyond the interface, and the security of which must be maintained, can easily be accessed, so that there remain concerns with respect to security and reliability. In particular, against new threats such as newly discovered security holes, any effective protection technique has not been established.

In security devices connecting between networks, as described above, high security and reliability are required. However, even if such a high degree of security and reliability are realized, it is unfavorable to make devices complicated and expensive in exchange for the realization.

This invention was devised in order to resolve the above-described problems, and has as an object the provision of an excellently economic security gateway system, and a method and program for such a system, in a gateway connecting a plurality of networks utilizing a standard protocol which has been standardized and the specifications of which have been published, which affords a high degree of security and reliability, and which, even in the event that illicit communication data has penetrated into the gateway from one network, prevents penetration of this communication data into other networks by a simple configuration that can be realized at a low price.

DISCLOSURE OF THE INVENTION

In order to attain the above object, in this invention, with focusing on technology for hardware virtualization, two sub-gateways individually realized as virtual machines on a physical hardware unit of a real machine are individually connected to two networks, and data exchange between the sub-gateways is performed by means of a nonstandard protocol; in addition, within a sub-gateway, data exchange between the nonstandard side and the standard side is performed only on the application layer. By this means, when illicit communication data penetrates into one sub-gateway from one network, penetration of the communication data into the other sub-gateway can be prevented. Here, various existing methods can be applied to technology for hardware virtualization (for example, see Non-Patent Documents 7 to 10).

A security gateway system of this invention is a security gateway system for connecting a plurality of networks each of which uses a standard protocol the standardized specifications of which have been published, characterized in that the security gateway system comprises two sub-gateways individually realized as virtual machines each of which is constituted of a virtual hardware unit constructed on a physical hardware unit of a real machine and an operating system working on the virtual hardware unit, and the two sub-gateways being individually connected to two networks to be connected. In the security gateway system, the sub-gateways are configured as explained below.

Each sub-gateway has a standard protocol communication portion, which performs communication with the network to which the same sub-gateway is connected using the standard protocol; a nonstandard protocol communication portion, which performs communication with the other sub-gateway using a nonstandard protocol, the specifications of which have not been published; a protocol conversion portion, which performs protocol conversion of communication data between the standard protocol and the nonstandard protocol; and a relay permission setting information storage portion, which holds relay permission setting information used to confirm relay permission for communication data.

The two sub-gateways are configured such that data can be exchanged between the nonstandard protocol communication portions using the nonstandard protocol. The nonstandard protocol communication portion of each sub-gateway is an original communication portion which has an implemented application layer which is a seventh layer in the Open Systems Interconnection (OSI) model, and which has unpublished and original communication layers implemented for the range corresponding to first through sixth layers, so that data exchange between the nonstandard protocol communication portion and the standard protocol communication portion within the same sub-gateway is performed only in the application layer which is the seventh layer, and data exchange is not possible in the range corresponding to the first through sixth layers. The protocol conversion portion of each sub-gateway refers to the relay permission setting information when performing protocol conversion of communication data to confirm relay permission for the communication data, and when relay has been permitted, performs protocol conversion of the communication data.

The standard protocol communication portion of each of said sub-gateways, is constituted of two parts which are individually constructed by individual construction methods different from each other, such that the first layer part is realized by a physical hardware unit for standard communication which is added to said physical hardware unit, and such that a part of the second through seventh layers is realized by said virtual machine.

The nonstandard protocol communication portion of each of said sub-gateways, is constituted of two parts which are individually constructed by individual construction methods different from each other, such that the first layer part is realized by a physical hardware unit having an original configuration for original communication which is added to said physical hardware unit, and such that a part of the second through seventh layers is realized by said virtual machine.

Further, a security gateway method and security gateway program of this invention incorporate the characteristics of the above system in the form of a method and in the form of a program individually.

By means of the above-described invention, two sub-gateways individually constructed as virtual machines on a physical hardware unit of a single real machine, work as mutually separated and independent computers, similar to when they are constructed as two real machines and communication between the sub-gateways is performed by means of a non-standard protocol the specifications of which have not been published. Hence in the event that illicit communication data from a network has penetrated into one of the sub-gateways, at the stage of protocol conversion of the communication data, the relay permission setting information is referred to and the fact that the communication data is illicit can be easily confirmed, and the communication data discarded or other appropriate processing performed, so that penetration of illicit communication data into the other sub-gateway can be prevented. Here, two sub-gateways are realized by two virtual machines constructed on a physical hardware unit of a single real machine, so physical hardware configuration of the total system is simplified, compared with when they are realized by two real machines.

Further, data exchange between the nonstandard-side and the standard-side protocol communication portions within each sub-gateway is performed only in the application layer, so that the nonstandard side and standard side are separated in layers below the protocol communication portions. Hence even in cases when illicit communication data from a network has penetrated via a security hole in the standard protocol communication portion in one sub-gateway, penetration to the nonstandard protocol communication portion can be prevented, and so penetration of illicit communication data to the other network can be prevented.

Further, communication between sub-gateways is performed using a nonstandard protocol the specifications of which have not been published. Consequently even in cases in which illicit communication data which has penetrated causes overwriting of relay permission setting information in one of the sub-gateways, the illicit communication data cannot penetrate into the other sub-gateway to overwrite relay permission setting information. Hence in such cases an anomaly can be detected based on the mismatch of relay permission setting information in the other sub-gateway, and the illicit communication data can be discarded or otherwise processed, so that penetration of illicit communication data into the other network can be reliably prevented.

Further, by communicating between the two sub-gateways using a nonstandard protocol as described above, security and reliability can be improved, and in addition standard protocols can be used to communicate with the networks to which each of the gateways is connected. As a result, legitimate users can easily use servers protected by a system of this invention, employing means similar to those used to connect to networks in general without the need for conversion between specialized protocols or languages or for other special measures, so that there are no drawbacks for user-friendliness. And, communication functions between the sub-gateways utilize a specialized and original transport layer API or similar, and so can easily be realized.

By means of this invention, an excellently economic security gateway system, as well as a method and program for a security gateway system, can be provided which, even in the event of penetration of illicit communication data from one network into the gateway, can prevent penetration of the communication data into another network by a simple configuration that can be realized at a low price, and which affords a high level of security and reliability.

BRIEF DESCRIPTION OF THE DRAWINGS

FIG. 8 shows an example of the configuration of data stored in the relay permission settings table of a non-secure network gateway in the first embodiment;

FIG. 9 shows an example of the configuration of data stored in the relay permission settings table of a secure network gateway in the first embodiment;

FIG. 10 is a configuration diagram showing the function configuration of the security gateway system of a second embodiment to which the invention is applied;

BEST MODE FOR CARRYING OUT THE INVENTION

Figure 1:
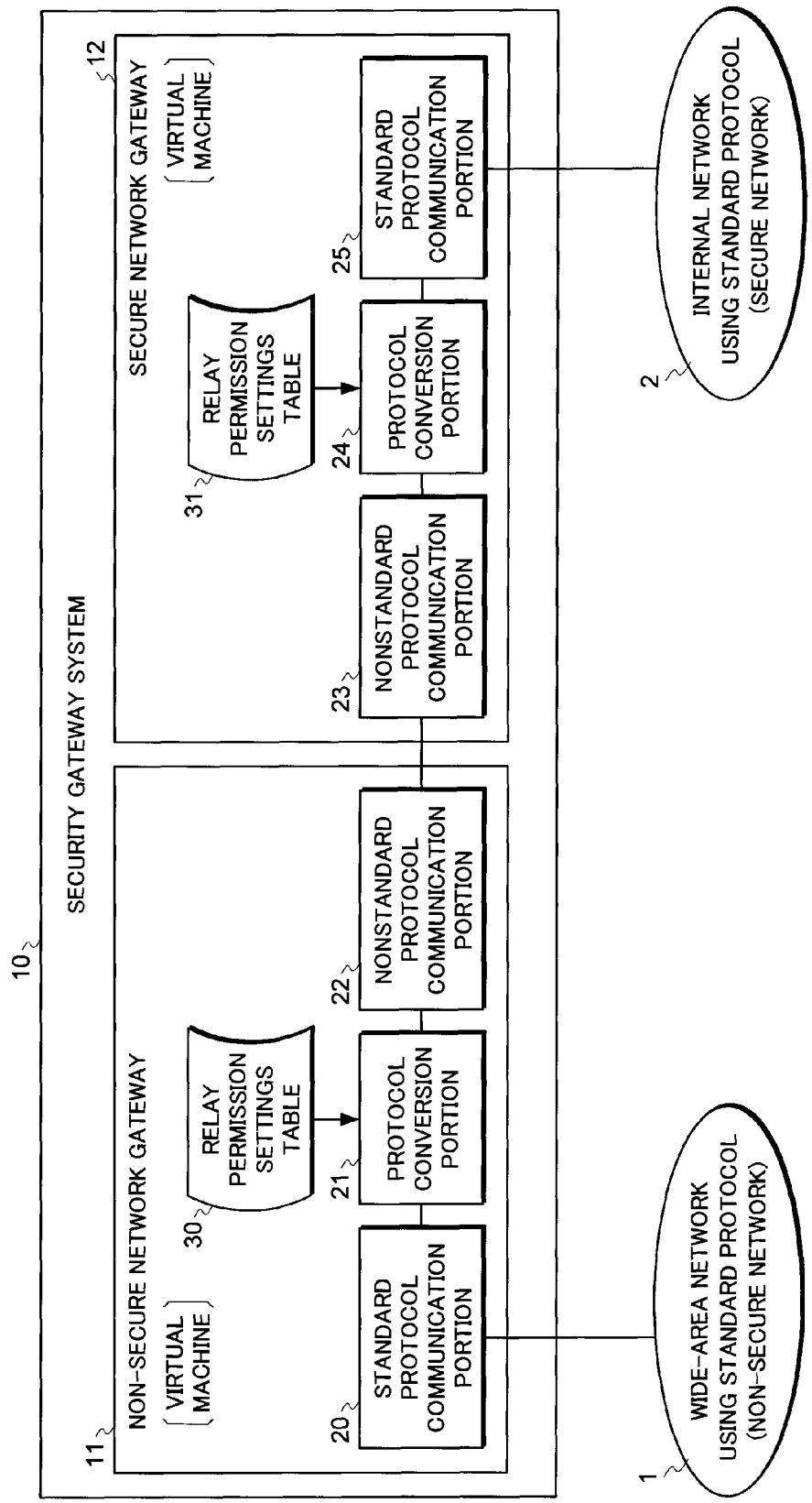
FIG. 1 is a configuration diagram showing the function configuration of the security gateway system of a first embodiment to which the invention is applied.

Below, embodiments of the invention are explained referring to the drawings. However, the embodiments described here in no way limit the invention, and are merely illustrations of modes of realization of the invention. This invention is typically realized by controlling computers using software. The software in this case effects the functions and advantageous results of each of the computers in the invention by physically utilizing the computer hardware; and technology of the prior art is applied as appropriate to portions to which technology of the prior art can be applied. The types and configurations of hardware and software employed to realize this invention, the scope of processing by software, and other parameters may be freely modified; for example, a program used to realize this invention is one mode of realization of the invention.

Explanation of Terms

Below, a number of important terms used in this Specification are explained in order.

"Secure network": A network which provides services within a company or to another specific group, and the security of which must be maintained.

"Non-secure network": A network, of which the Internet is representative, which is a wide-area network or public network, which is connected to and used by numerous unspecified people.

"Standard protocol": A communication protocol based on standards instituted by the International Standards Organization (ISO), IEEE, ANSI, ITU, IEC, JIS, or another standards organization, the specifications of which have been published and can be obtained by anyone.

"Nonstandard protocol": A communication protocol which has not been instituted by a standards organization, and the specifications of which have not been published.

"Non-secure network gateway": A sub-gateway which executes communication with a non-secure network using a standard protocol, which performs communication with its own network using a nonstandard protocol, and which performs bidirectional data relaying between the non-secure network and its own network.

"Secure network gateway": A sub-gateway which executes communication with a secure network using a standard protocol, performs communication with its own network using a nonstandard protocol, and which performs bidirectional data relaying between the secure network and its own network.

"Relay permission settings table": A table which stores settings data to use in confirming whether relaying is permitted for communication data. This table is possessed by both of a non-secure network gateway and a secure network gateway, respectively.

"Protocol conversion": Conversion between a standard protocol and a nonstandard protocol.

"Intrusion detection system (unauthorized access monitoring system)": A system which is used in the field of network security and abbreviated to IDS. The system has a function that outputs/displays an alarm signal when a packet considered as unauthorized access is discovered and that collects and stores the communication log. In general, the system has a function that traces intruder (cracker).

FIRST EMBODIMENT

Function Configuration

FIG. 1 is a configuration diagram showing the function configuration of the security gateway system (hereafter abbreviated as appropriate to "system") of a first embodiment to which the invention is applied.

As shown in FIG. 1, the security gateway system 10 of this embodiment is constituted of two sub-gateways, which are a non-secure network gateway 11, connected to a wide-area network (non-secure network) 1 using a standard protocol, and a secure network gateway 12, connected to an internal network (secure network) 2 using a standard protocol. Here, the non-secure network gateway 11 and the secure network gateway 12 are realized by means of each single virtual machine constructed a physical hardware unit of a single real machine.

The non-secure network gateway 11 is constituted of a standard protocol communication portion 20, protocol conversion portion 21, nonstandard protocol communication portion 22, and relay permission settings table 30. The secure network gateway 12 is constituted of a nonstandard protocol communication portion 23, protocol conversion portion 24, standard protocol communication portion 25, and relay permission settings table 31.

Each of the above portions is explained in detail below.

The wide-area network 1 using a standard protocol is a network which uses a communication protocol which has published, standardized specifications, and in general is a network, such as the Internet, which can be connected to and used by numerous unspecified people. Consequently there is the possibility that malicious participants may connect to and use the network as well, and the network has a low level of security. As explained above, in this Specification, such a network with low security is called a "non-secure network".

The internal network 2 using a standard protocol is a network the purpose of which is to provide services to a specific group, such as within a company, and is a network for which security must be maintained, and which requires protection against intrusions and attacks from the wide-area network 1 using a standard protocol. As explained above, in this Specification, such a network for which security is required to be maintained is called a "secure network".

The security gateway system 10 of this embodiment is a system which can connect the above-described non-secure network 1 with low security to a secure network 2 for which security is required to be maintained, while ensuring security. In this case, communication performed to connect to the non-secure network 1, and communication performed to connect to the secure network 2, are both performed using a standard protocol the specifications of which have been published. On the other hand, communication between the two sub-gateways in the security gateway system 10, that is, communication between the non-secure network gateway 11 and the secure network gateway 12, is performed using a nonstandard protocol the specifications of which have not been published.

The portions 20 through 25 of the non-secure network gateway 11 and the secure network gateway 12 have the functions described below, in order to realize communication using a standard protocol with the networks 1 and 2, as well as communication using a nonstandard protocol between the sub-gateways 11 and 12, as described above.

In the non-secure network gateway 11, the standard protocol communication portion 20 has functions for communication with the non-secure network 1 connected to the non-secure network gateway 11 using the standard protocol, and the nonstandard protocol communication portion 22 has functions for communication with the secure network gateway 12 using the nonstandard protocol the specifications of which have not been published.

In the secure network gateway 12, the standard protocol communication portion 25 has functions for communication with the secure network 2 connected to the secure network gateway 12 using the standard protocol, and the nonstandard protocol communication portion 23 has functions for communication with the non-secure network gateway 11 using the nonstandard protocol the specifications of which have not been published.

In the non-secure network gateway 11 and secure network gateway 12, each of the protocol conversion portions 21 and 24 has functions for data conversion between the standard protocol and the nonstandard protocol. Each of the protocol conversion portions 21, 24 refers to a relay permission settings table 30, 31 to confirm whether relaying of the communication data is permitted when performing protocol conversion of the communication data, and performs protocol conversion of the communication data only when relaying has been permitted.

Each of the relay permission settings tables 30, 31 has functions for storing relay permission setting information, to be used in confirming whether relaying is permitted for communication data, and is equivalent to the relay permission setting information storage portion of the invention. As relay permission setting information, transmission source permission information including transmission source addresses indicating permitted transmission sources, and destination permission information including destination addresses indicating permitted destinations, are set in advance and stored.

Computer Resource Configuration

Figure 2:
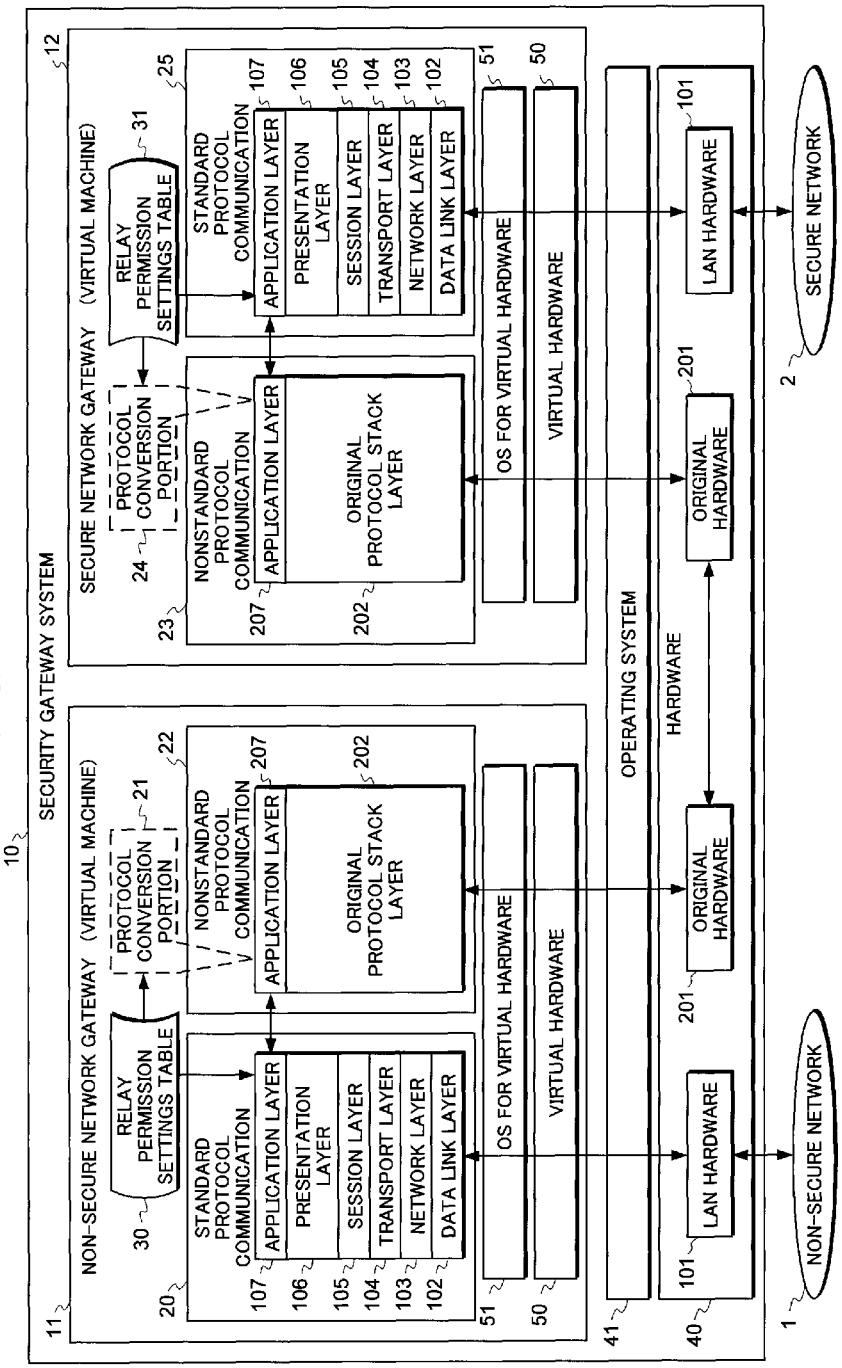
FIG. 2 is a conceptual diagram, using hardware resources and operating system resources to show the computer resource configuration of the first embodiment, and using the concept of the Open Systems Interconnection (OSI) model of communication layers to show the configuration of the standard protocol communication portions and nonstandard protocol communication portions.

FIG. 2 is a configuration diagram, using hardware resources and operating system resources to show the computer resource configuration of the security gateway system 10 shown in FIG. 1, and using the concept of the Open Systems Interconnection (OSI) model of communication layers to show the configuration of the standard protocol communication portions 20, 25 and nonstandard protocol communication portions 22, 23 in the non-secure network gateway 11 and secure network gateway 12.

As shown in FIG. 2, the security gateway system 10 is constituted of a physical hardware unit 40 which constitutes a computer hardware unit for a single real machine and an operating system 41 for using the physical hardware unit 40. Here, LAN hardware units 101, each of which is constituted of a network board and performs IP communication, and original hardware units 201, each of which has an original configuration and performs original non-IP communication, are added to the physical hardware unit 40. Each of the LAN hardware units 101 constitutes each hardware layer of the standard protocol communication portions 20, 25, and each of the original hardware units 201 constitutes each hardware layer of the nonstandard protocol communication portions 22, 23.

Further, the non-secure network gateway 11 is a virtual machine which is constituted of a virtual hardware unit 50 constructed on a physical hardware unit 40 of the real machine of the security gateway system 10 and an operating system (OS) for virtual hardware 51 working on the virtual hardware unit 50. The standard protocol communication portions 20, the protocol conversion portions 21, the nonstandard protocol communication portions 22, and the relay permission settings table 30 are configured inside the virtual machine which constitutes the non-secure network gateway 11.

Similarly, the secure network gateway 12 also is a virtual machine which is constituted of a virtual hardware unit 50 constructed on a physical hardware unit 40 of the real machine of the security gateway system 10 and an operating system (OS) for virtual hardware 51 working on the virtual hardware unit 50. The nonstandard protocol communication portions 23, the protocol conversion portions 24, the standard protocol communication portions 25, and the relay permission settings table 31 are configured inside the virtual machine which constitutes the secure network gateway 12.

Here, the techniques described in Non-Patent Documents 7 to 10 can be applied to virtualization technology for configuring such virtual machines. Any of these existing virtualization technology, using a microprocessor having a virtual mechanism and an operating system for using the function of the microprocessor, a plurality of virtualized computers can be constructed inside a single physical computer.

Further, as shown in FIG. 2, the standard protocol communication portions 20, 25 have implemented communication layers which are the first through seventh communication layers of the Open Systems Interconnection (OSI) model, that is, a LAN hardware unit 101 located at hardware layer, data link layer 102, network layer 103, transport layer 104, session layer 105, presentation layer 106, and application layer 107, in order to perform communication using a standard protocol.

In the non-secure network gateway 11 and secure network gateway 12, physical connection of the standard protocol communication portions 20, 25 to the networks 1, 2 are performed by the network boards constituting the LAN hardware units 101 located at hardware layer. For the non-secure network gateway 11 and secure network gateway 12 realized as virtual machines, through the virtual hardware unit 50 and operating system (OS) for virtual hardware 51 which constitute those virtual machines, the LAN hardware units 101 also work as virtualized hardware units.

On the other hand, the nonstandard protocol communication portions 22, 23 have an original configuration, having an implemented application layer 207, which is the seventh layer in the Open Systems Interconnection (OSI) model, and for the range corresponding to the first through sixth layers, an original hardware unit 201 located at hardware layer and original protocol stack layer 202, as unpublished and original communication layers. The nonstandard protocol communication portions 22, 23 thus have an unpublished and original configuration for the range from the first layer to the sixth layer, and so data exchange with the standard protocol communication portions 20, 25 is performed only in the seventh or application layer 207, and data exchange is not possible over the range corresponding to the first through sixth layers. Further, the nonstandard protocol communication portions 22, 23 are not equipped with applications which perform the various standard services (ftp, telnet, and similar) with which standard protocol communication portions 20, 25 are typically equipped.

In the non-secure network gateway 11 and secure network gateway 12, connection between the nonstandard protocol communication portions 22, 23 is performed by the network boards constituting the original hardware units 201 located at hardware layer. For the non-secure network gateway 11 and secure network gateway 12 realized as virtual machines, through the virtual hardware unit 50 and operating system (OS) for virtual hardware 51 which constitute those virtual machines, the original hardware units 201 also work as virtualized hardware units.

Further, as shown in FIG. 2, the protocol conversion portions 21, 24 can be realized through the application layers 207 of the nonstandard protocol communication portions 22, 23, but may also be configured independently and separately from the nonstandard protocol communication portions 22, 23.

Separated/Independent Operation of Virtual Machines

By means of the security gateway system 10 of the above-described first embodiment, two sub-gateways 11, 12, which are individually constructed as virtual machines on the physical hardware unit 40, work as mutually separated and independent computers, similar to when they are constructed as two real machines. Such separated and independent operation of virtual machines is described in detail below.

First, as describe above, the security gateway system 10 of the above-described first embodiment, is constituted of the physical hardware unit 40 and operating system 41. The hardware units added to the hardware unit 40, are the LAN hardware unit 101 for LAN and the original hardware unit 201 for performing an communication by an original method.

In general, programs which are executed on physical computer hardware, are protected by access right. In the simplest method, programs are protected by two level protection of a privileged protection of a mode in which an operating system operates and a general protection of a mode in which an application program operates. Further, for a high degree of protection method, a ring protection method of four layers is used.

In this embodiment, such ring protection method is applied, and the operating system 41 loaded on the physical hardware unit 40, is set as an operating mode of the highest privilege level in the ring protection. Under these conditions, the control of the physical hardware unit 40, the LAN hardware unit 101 and original hardware 201, which are added to the physical hardware unit 40, is performed.

On the other hand, the virtual hardware unit 50, which is constructed on the operating system 41, is simulated by the operating system 41. The operating system 51 for virtual hardware, which is loaded on the simulated virtual hardware unit 50, operates under the protection of lower privilege level in the ring protection compared with the operating system 41. That is, a virtual machine constructed on the virtual hardware unit 50, has not any direct access right to the physical hardware unit 40, and access to the physical hardware unit 40 is allowed only through the intervention of the operating system 41.

In this embodiment, a plurality of such virtual hardware units 50 are defined to configure a plurality of mutually separated and independent virtual machines on the single physical hardware unit 40. The configured plurality of virtual machines can not directly access each other, and can access only indirectly through the intervention of the operating system 41. As a result, the two sub-gateways 11, 12 individually constructed as virtual machines on the physical hardware unit 40 of the single real machine, work as mutually separated and independent computers, similar to when they are constructed as two real machines System Operation FIG. 3 is a flowchart showing in summary, in the security gateway system 10 of the above-described first embodiment, the operation of the two sub-gateways 11, 12 individually constructed as virtual machines on the physical hardware unit 40 of a single real machine.

Figure 3:
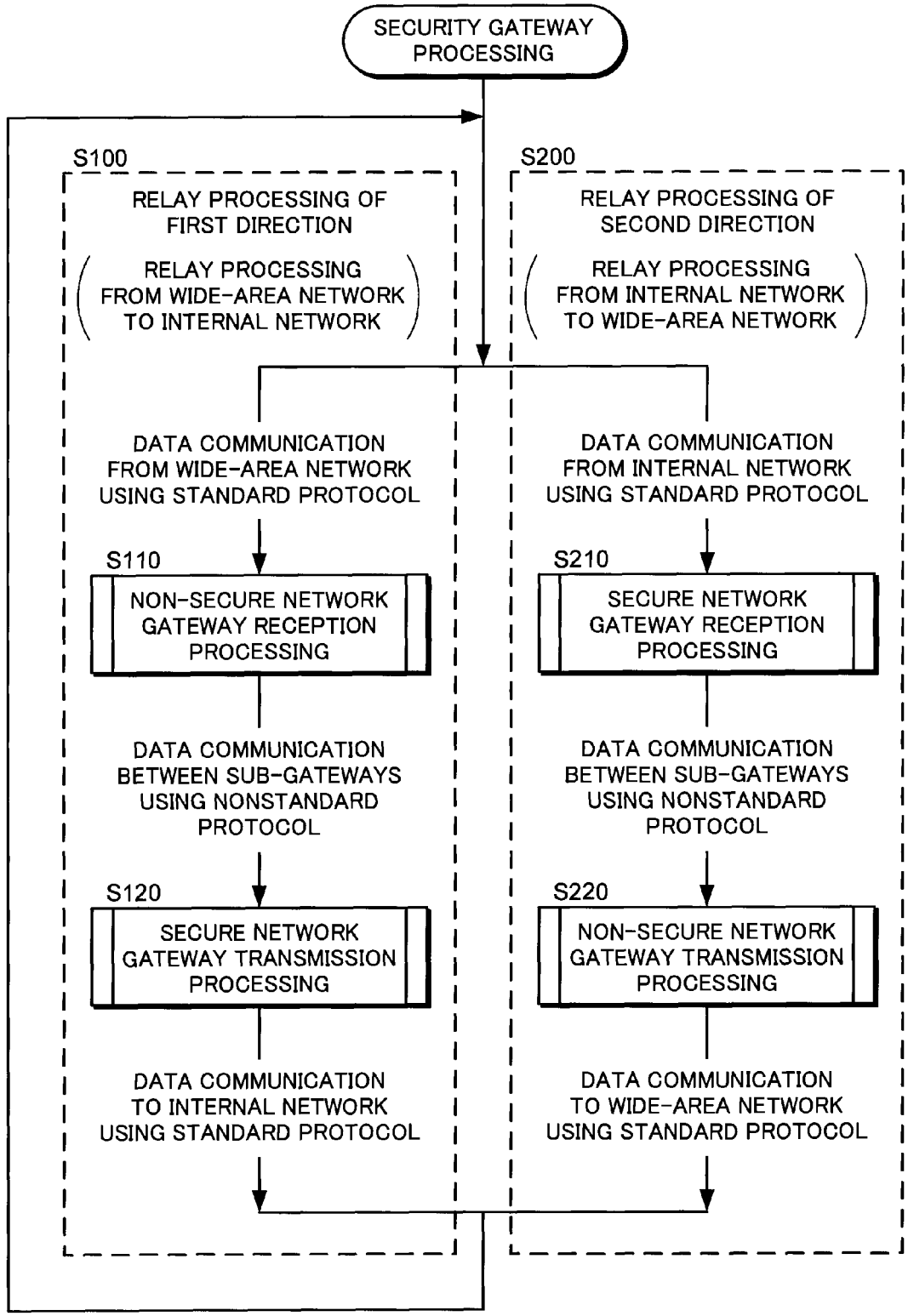
FIG. 3 is a flowchart showing in summary the operation of the security gateway system of the first embodiment.

As shown in FIG. 3, the security gateway system 10 of this embodiment performs relay processing in two directions, which are the relay processing of a first direction (S100) and the relay processing of a second direction (S200), as security gateway processing.

Here, the relay processing of the first direction (S100) is relay processing from the wide-area network (non-secure network) 1 using a standard protocol, to the internal network (secure network) 2 using a nonstandard protocol. And, the relay processing of the second direction (S200) is relay processing from the internal network (secure network) 2 using the nonstandard protocol, to the wide-area network (non-secure network) 1 using the standard protocol.

In the relay processing of the first direction (S100), non-secure network gateway reception processing (S110) from the non-secure network gateway 11 is first performed, according to data communication from the wide-area network 1 using the standard protocol. That is, communication data is received using the standard protocol by the standard protocol communication portion 20, conversion into the nonstandard protocol is performed by the protocol conversion portion 21 after referring to the relay permission settings table 30, and processing for transmission to the secure network gateway 12 is performed by the nonstandard protocol communication portion 22. As a result, data communication using the nonstandard protocol from the non-secure network gateway 11 to the secure network gateway 12 is performed.

In this way, secure network gateway transmission processing (S120) is performed by the secure network gateway 12, according to data communication from the non-secure network gateway 11 using the nonstandard protocol. That is, the nonstandard protocol communication data is received by the nonstandard protocol communication portion 23, and after referring to the relay permission settings table 31, the protocol conversion portion 24 converts the data into the standard protocol; the standard protocol communication portion 25 then performs processing for transmission to the internal network 2 using the standard protocol. As a result, data communication is performed from the secure network gateway 12 to the internal network 2 using the standard protocol.

In the relay processing of the second direction (S200), secure network gateway reception processing (S210) is first performed by the secure network gateway 12, according to data communication from the internal network 2 using the standard protocol. That is, communication data is received by the standard protocol communication portion 25 using the standard protocol, and after referring to the relay permission settings table 31, the protocol conversion portion 24 converts the data into the nonstandard protocol; the nonstandard protocol communication portion 23 then performs processing for transmission to the non-secure network gateway 11. As a result, data communication is performed from the secure network gateway 12 to the non-secure network gateway 11 using the nonstandard protocol.

Non-secure network gateway transmission processing (S220) is performed by the non-secure network gateway 11 according to data communication from the secure network gateway 12 using the nonstandard protocol in this way. That is, nonstandard protocol communication data is received by the nonstandard protocol communication portion 22, and after referring to the relay permission settings table 30, the protocol conversion portion 21 converts the data to the standard protocol; then the standard protocol communication portion 20 performs processing to transmit the data to the wide-area network using the standard protocol. As a result, data communication using the standard protocol from the non-secure network gateway 11 to the wide-area network 1 is performed.

In the above-described processing (S110, S120, S210, S220) in the non-secure network gateway 11 and secure network gateway 12, the protocol conversion portions 21, 24 refer to the relay permission settings tables 30 and 31, and when relaying is not permitted for the transmission source or destination of the communication data, the communication data is discarded.

Advantageous Effect

By means of the security gateway system of the first embodiment as described above, an excellently economic security gateway system, as well as a method for a security gateway system, can be provided which, even in the event of penetration of illicit communication data from a non-secure network into the gateway, can prevent penetration of the communication data into a secure network by a simple configuration that can be realized at a low price, and which affords a high level of security and reliability. The advantageous effect is described in detail below.

First, the non-secure network gateway and the secure network gateway, which are individually constructed as virtual machines on a physical hardware unit of a single real machine, work as mutually separated and independent computers, similar to when they are constructed as two real machines, and communication between these sub-gateways is performed by means of a nonstandard protocol the specifications of which have not been published. Hence when illicit communication data from the non-secure network penetrates into the non-secure network gateway, at the stage of protocol conversion of the communication data, the relay permission settings table is referred to, and the fact that the communication data is illicit can easily be confirmed, and the communication data discarded or other appropriate processing performed, so that intrusion of the illicit communication data into the secure network gateway can be prevented.

By this means, the security of the secure network can be enhanced, as a result, a security gateway system, which affords excellent security and reliability, can be provided. Here, two sub-gateways are realized by two virtual machines constructed on a physical hardware unit of a single real machine, so physical hardware configuration of the total system is simplified, compared with when they are realized by two real machines. As a result, an excellently economic security gateway system can be provided.

The nonstandard protocol communication portion in each of the sub-gateways has an implemented application layer which is a seventh layer of the Open Systems Interconnection (OSI) model, and for the range corresponding to the first through sixth layers, unpublished and original communication layers are implemented separately from the lower layers of the standard protocol communication portion, so that data exchange between the nonstandard protocol communication portion and the standard protocol communication portion within the same sub-gateway is performed only in the seventh or application layer. As a result, illicit communication data which has penetrated into the standard protocol communication portion can be prevented from penetrating from the lower layers.

That is, in general when using IP or another standard protocol, communication layers in the Open Systems Interconnection (OSI) model have specifications enabling data exchange with other layers on the same level. Hence in contrast with this embodiment, when a standard protocol is simply used to connect the communication portion connected to a non-secure network with a communication portion connected to a secure network, unfortunately, lower layers can relay data by circumventing communication with upper layers.

On the other hand, in this embodiment, data communication between the standard protocol communication portion connected to the non-secure network and the standard protocol communication portion connected to the secure network is performed via nonstandard protocol communication portions, which has implemented original communication layers, the specifications of which are not published, corresponding to the first through sixth layers of the Open Systems Interconnection (OSI) model, so that circumvention and relaying of data in the range from the OSI first to sixth layers is not possible. Consequently data communication between the standard protocol communication portion and the nonstandard protocol communication portion can be performed only in the OSI seventh or application layer.

Hence even in cases where spoofed packets or other illicit communication data from the non-secure network penetrates a security hole in the standard protocol communication portion of the non-secure network gateway, penetration into the nonstandard protocol communication portion can be prevented, so that penetration of illicit communication data into the secure network can be prevented, and in this respect also, security of the secure network can be enhanced.

Further, even in a case in which the relay permission settings table of the non-secure network gateway has been overwritten by illicit communication data which has penetrated from the non-secure network, because communication between the sub-gateways is performed using a nonstandard protocol the specifications of which have not been published, the illicit communication data cannot penetrate into the secure network gateway and overwrite the relay permission settings table. Hence in such a case, by detecting an anomaly based on a mismatch between the information stored in the relay permission settings table in the secure network gateway and the transmission source or destination comprised by the illicit communication data, and by discarding the illicit communication data or performing other appropriate processing, penetration of the illicit communication data into the secure network can be prevented; in this respect also, security of the secure network can be enhanced.

Moreover, when a DoS (Denial of Service) attack is received by a server connected to the secure network and which is providing various services, the non-secure network gateway is affected by the attack, but the nonstandard protocol communication portion of the non-secure network gateway is not provided with applications (ftp, telnet, and similar), positioned on the OSI seventh layer, which provide various standard services. For this reason, the DoS attack data is not relayed to the secure network gateway, and the attack does not reach servers of the secure network, so that server services can be continued. Hence in this respect also, security of the secure network can be enhanced.

Further, by using a nonstandard protocol for communication between the two sub-gateways as described above, security and reliability can be improved, and in addition each of the sub-gateways and the networks to which they are connected can communicate using a standard protocol. Hence legitimate users can easily utilize servers protected by a system of this invention, employing methods (such as ftp, SQL, and similar) similar to those used in ordinary connections to networks, without the need for special protocols or languages or for other special measures, so that there are no drawbacks with respect to user-friendliness. And, communication functions between sub-gateways can easily be realized by utilizing a dedicated and original transport layer API or similar.

Specific Example of Security Gateway Processing

Below, specific examples of specific data processing procedures for enhancing security are described, as specific security gateway processing by the security gateway system 10 of the above-described first embodiment.

FIG. 4 through FIG. 7 are flowcharts showing the processing procedure when the sub-gateways 11, 12 wait for packet data reception, as examples of processing procedures for the non-secure network gateway reception processing (S110), secure network gateway transmission processing (S120), secure network gateway reception processing (S210), and non-secure network gateway transmission processing (S220), shown in FIG. 3.

Also, FIG. 8 and FIG. 9 show examples of the configuration of data stored in the relay permission settings tables 30, 31 of the non-secure network gateway and secure network gateway 12. In these examples, transmission source permission information comprising transmission source addresses, and protocol numbers, port numbers, as well as destination permission information comprising port numbers and destination addresses, are stored in the relay permission settings tables 30, 31.

Because the security gateway system 10 normally performs data relaying for a plurality of transmission sources and destinations, normally a plurality of transmission source addresses and a plurality of destination addresses are set in the transmission source permission information and destination permission information, as shown in FIG. 8 and FIG. 9.

Below, details of the processing procedures shown in FIG. 4 through FIG. 7 are explained in order, for cases in which the relay permission settings tables 30, 31 shown in FIG. 8 and FIG. 9 are used.

Figure 4:
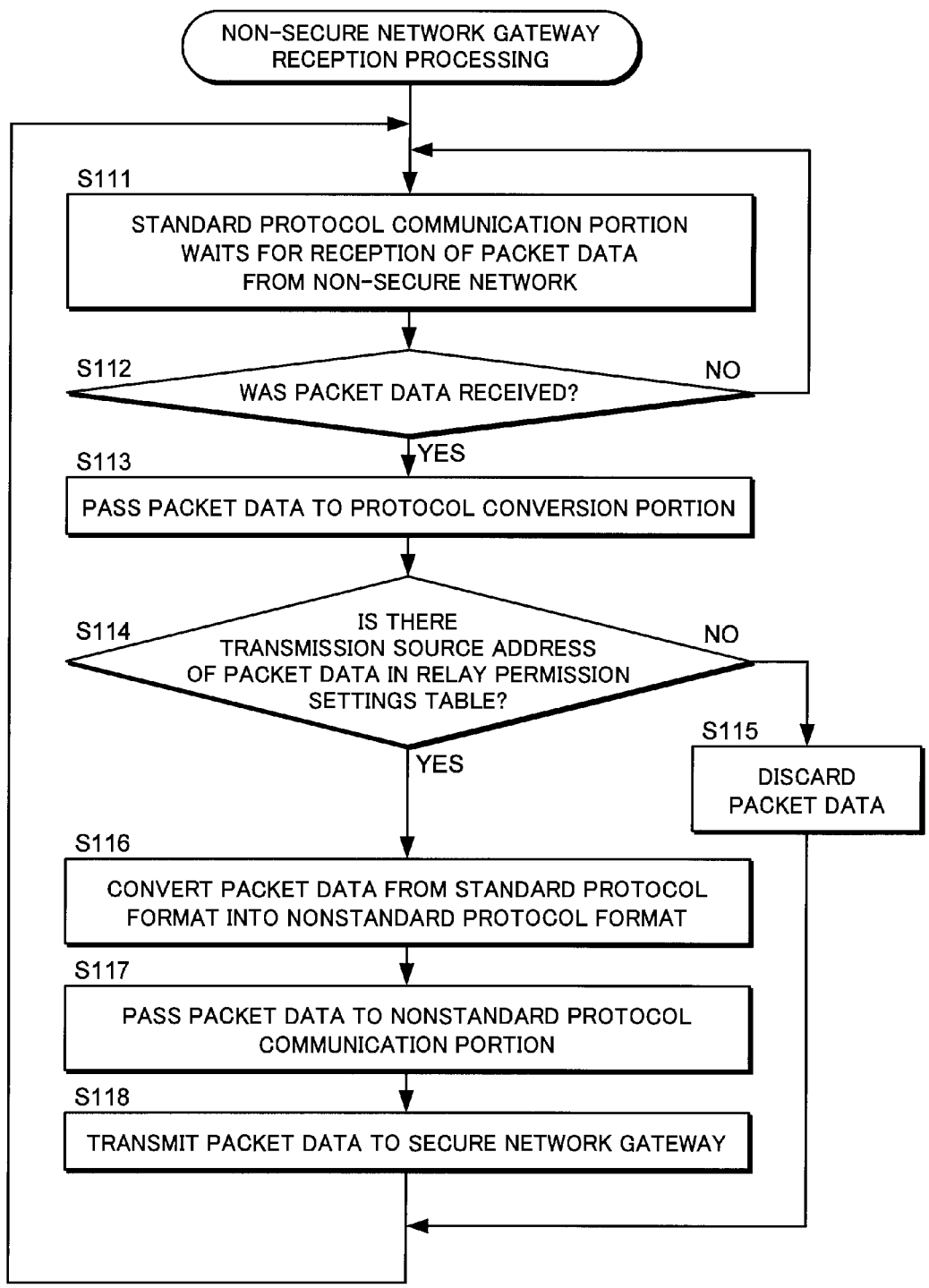
FIG. 4 is a flowchart showing an example of the processing procedure for the non-secure network gateway reception processing in FIG. 3.

As shown in FIG. 4, in the non-secure network gateway reception processing (S110), the standard protocol communication portion 20 of the non-secure network gateway 11 refers to the relay permission settings table 30 in the non-secure network gateway 11, and waits for reception of packet data from the non-secure network 1 according to the transmission source permission information (S111). Upon receiving packet data from the non-secure network 1 ("YES" in S112), the standard protocol communication portion 20 passes this packet data to the protocol conversion portion 21 (S113).

The protocol conversion portion 21 compares the transmission source address of the received packet data with the transmission source addresses in the transmission source permission information of the relay permission settings table 30 shown in FIG. 8, and judges whether there is a matching transmission source address (S114). If there is no matching transmission source address ("NO" in S114), the received packet data is discarded (S115), and processing returns to S110 to await reception of the next packet data.

When a transmission source address which matches the transmission source address of the received packet data is present in the relay permission settings table 30 ("YES" in S114), the protocol conversion portion 21 converts the received packet data from the standard protocol format into the nonstandard protocol format (S116), and passes the converted packet data to the nonstandard protocol communication portion 22 (S117).

The nonstandard protocol communication portion 22 refers to the destination permission information of the relay permission settings table 30 shown in FIG. 8, and if the address of the secure network gateway 12 is set as a destination address, performs communication using the nonstandard protocol to transmit the packet data to the nonstandard protocol communication portion 23 of the secure network gateway 12 (S118).

By means of the non-secure network gateway reception processing (S110) described above, packet data in the standard protocol format received by the non-secure network gateway 11 from the non-secure network 1 is converted into the nonstandard protocol format and is passed to the secure network gateway 12.

Figure 5:
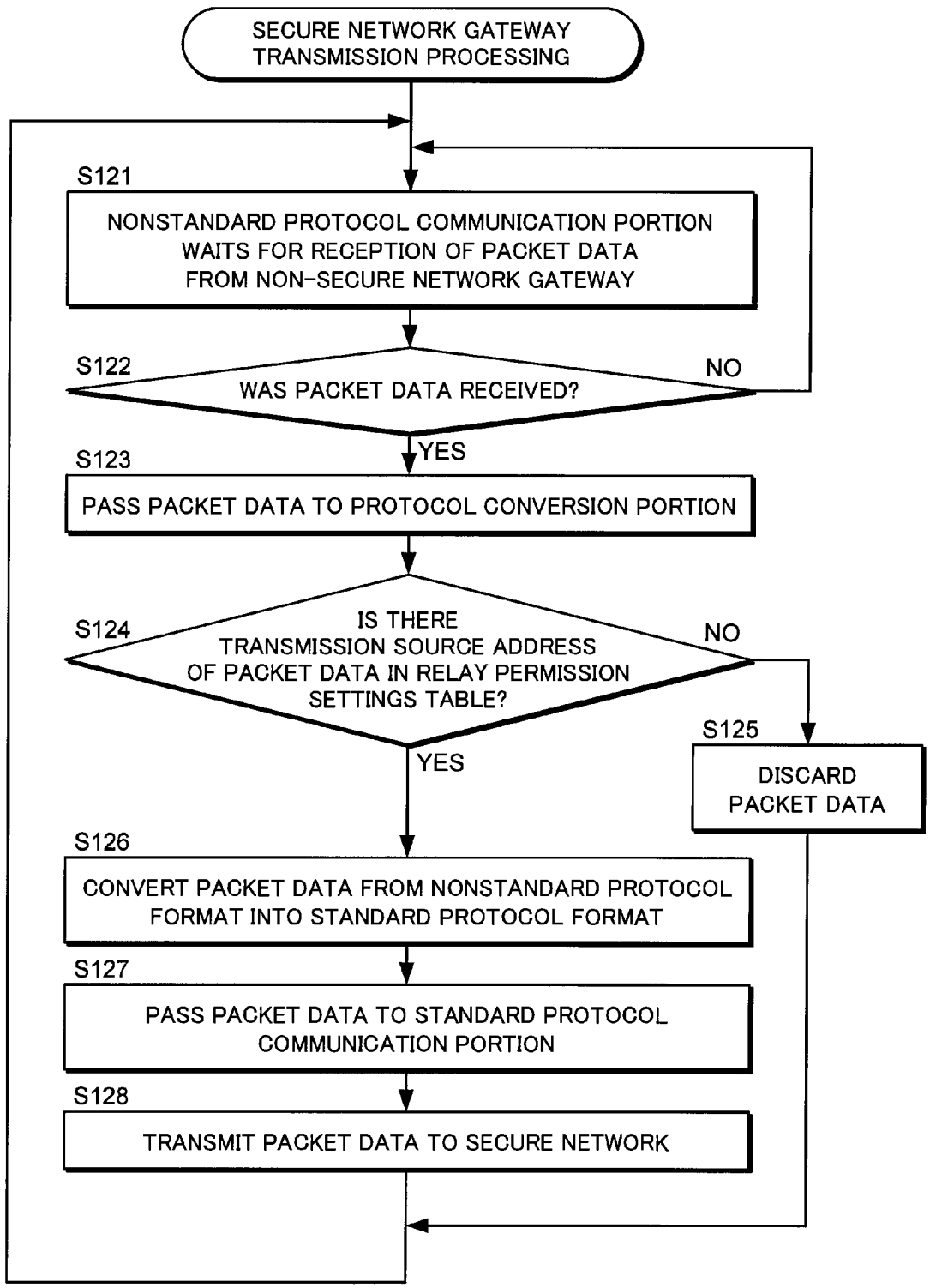
FIG. 5 is a flowchart showing an example of the processing procedure for the secure network gateway transmission processing in FIG. 3.

As shown in FIG. 5, in the secure network gateway transmission processing (S120), the nonstandard protocol communication portion 23 of the secure network gateway 12 refers to the relay permission settings table 31 in the secure network gateway 12, and waits for reception of packet data from the non-secure network gateway 11 conforming to the transmission source permission information (S121). Upon receiving packet data from the nonstandard protocol communication portion 22 of the non-secure network gateway 11 ("YES" in S122), the nonstandard protocol communication portion 23 passes the packet data to the protocol conversion portion 24 (S123).

The protocol conversion portion 24 compares the transmission source address of the received packet data with the transmission source addresses in the transmission source permission information of the relay permission settings table 31 shown in FIG. 9, and judges whether there is a matching transmission source address (S124). If there is no matching transmission source address ("NO" in S124), the received packet data is discarded (S125), and processing returns to S120 to await reception of the next packet data.

If a transmission source address matching the transmission source address of the received packet data exists in the relay permission settings table 31 ("YES" in S124), the protocol conversion portion 24 converts the received packet data from the nonstandard protocol format to the standard protocol format (S126), and passes the converted packet data to the standard protocol communication portion 25 (S127).

The standard protocol communication portion 25 refers to the destination permission information of the relay permission settings table 31 shown in FIG. 9, and when an address in the secure network 2 is set as the destination address, performs communication using the standard protocol to transmit the packet data to the address in the secure network 2 (S128).

By means of the secure network gateway transmission processing (S120) described above, packet data from the non-secure network gateway 11, received by the secure network gateway 12 in the nonstandard protocol format, is converted into the standard protocol format and transmitted to the secure network 2.

Figure 6:
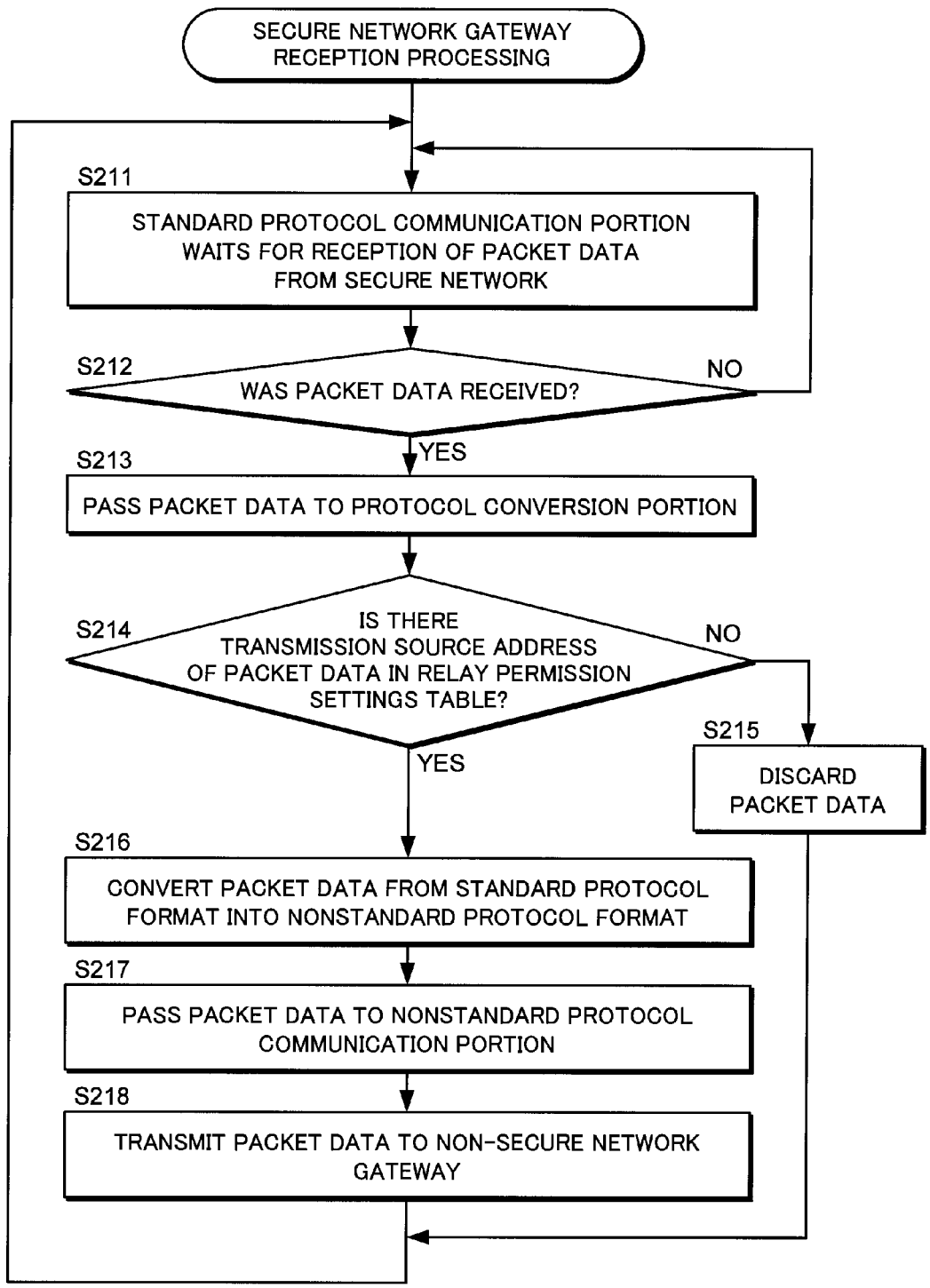
FIG. 6 is a flowchart showing an example of the processing procedure for the secure network gateway reception processing in FIG. 3.

As shown in FIG. 6, in secure network gateway reception processing (S210), the standard protocol communication portion 25 of the secure network gateway 12 refers to the relay permission settings table 31 in the secure network gateway 12, and waits for reception of packet data from the secure network 2 conforming to the transmission source permission information (S211). Upon receiving packet data from the secure network 2 ("YES" in S212), the standard protocol communication portion 25 passes the packet data to the protocol conversion portion (S213).

The protocol conversion portion 24 compares the transmission source address of the received packet data with the transmission source addresses of transmission source permission information in the relay permission settings table 31 shown in FIG. 9, and judges whether there is a matching transmission source address (S214). If there is no matching transmission source address ("NO" in S214), the received packet data is discarded (S215), and processing returns to S210 to await reception of the next packet data.

Further, when a transmission source address matching the transmission source address in the received packet data is present in the relay permission settings table 31 ("YES" in S214), the protocol conversion portion 24 converts the received packet data from the standard protocol format to the nonstandard protocol format (S216), and passes the converted packet data to the nonstandard protocol communication portion 23 (S217).

The nonstandard protocol communication portion 23 refers to the destination permission information in the relay permission settings table 31 shown in FIG. 9, and if the address of the non-secure network gateway 11 is set in the destination addresses, performs communication using the nonstandard protocol to transmit the packet data to the nonstandard protocol communication portion 22 of the non-secure network gateway 11 (S218).

By means of the above-described secure network gateway reception processing (S210), packet data received from the secure network 2 by the secure network gateway 12 in the standard protocol format is converted into the nonstandard protocol format and is passed to the non-secure network gateway 11.

Figure 7:
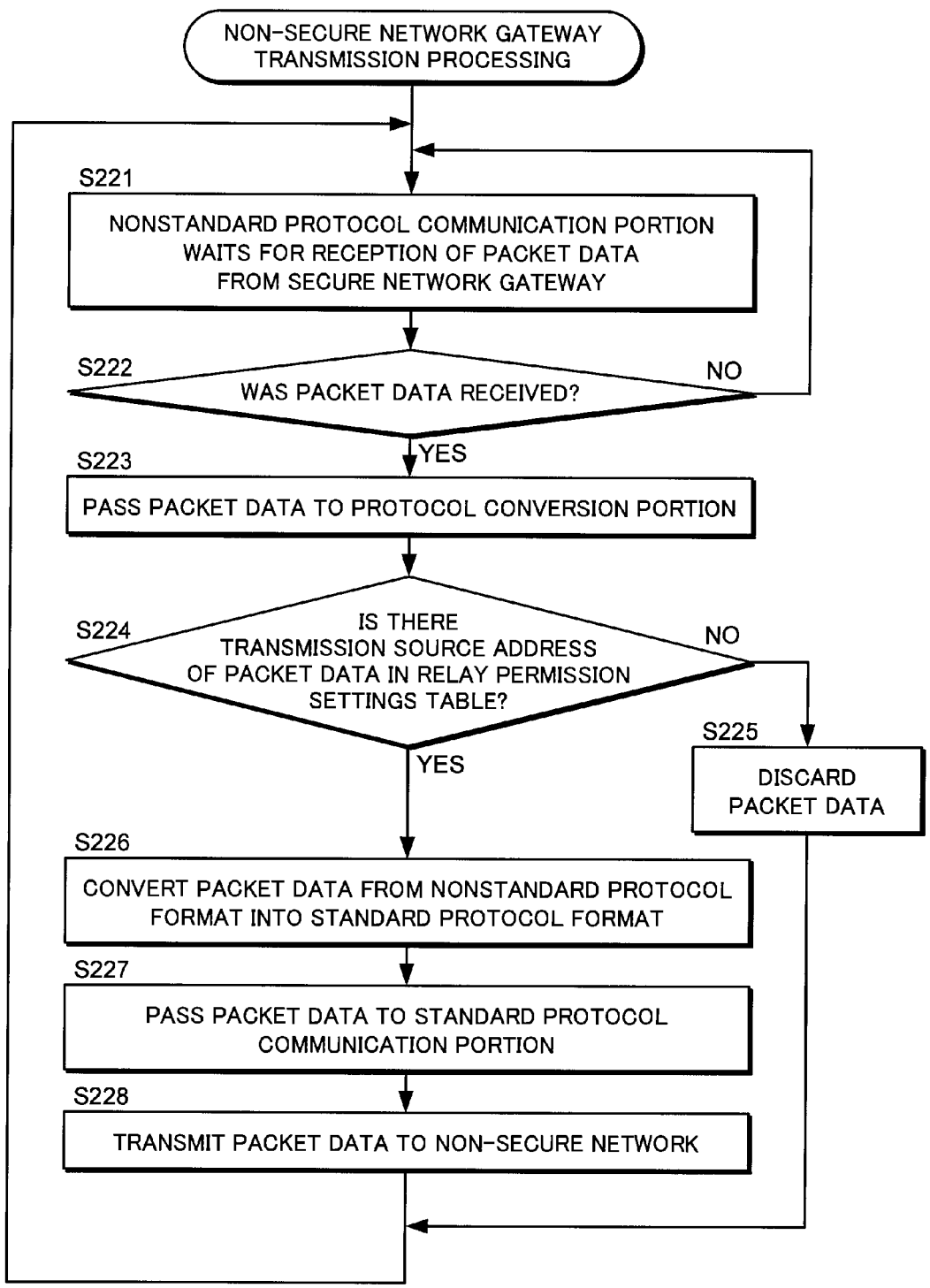
FIG. 7 is a flowchart showing an example of the processing procedure for the non-secure network gateway transmission processing in FIG. 3.

As shown in FIG. 7, in non-secure network gateway transmission processing (S220), the nonstandard protocol communication portion 22 of the non-secure network gateway 11 refers to the relay permission settings table 30 in the non-secure network gateway 11, and waits for reception of packet data from the secure network gateway 12 conforming to the transmission source permission information (S221). Upon receiving packet data from the nonstandard protocol communication portion 23 of the secure network gateway 12 ("YES" in S222), the nonstandard protocol communication portion 22 passes the packet data to the protocol conversion portion 21 (S223).

The protocol conversion portion 21 compares the transmission source address of the received packet data with the transmission source addresses in the transmission source permission information of the relay permission settings table 30 shown in FIG. 8, and judges whether there is a matching transmission source address (S224). If there is no matching transmission source address ("NO" in S224), the received packet data is discarded (S225), and processing returns to S220 to await reception of the next packet data.

If a transmission source address matching the transmission source address of the received packet data exists in the relay permission settings table 30 ("YES" in S224), the protocol conversion portion 21 converts the received packet data from the nonstandard protocol format to the standard protocol format (S226), and passes the converted packet data to the standard protocol communication portion 20 (S227).

The standard protocol communication portion 20 refers to the destination permission information in the relay permission settings table 30 shown in FIG. 8, and when an address in the non-secure network 1 is set as the destination address, performs communication using the standard protocol to transmit the packet data to the address in the non-secure network 1 (S228).

By means of the non-secure network gateway transmission processing (S220) described above, packet data from the secure network gateway 12, received by the non-secure network gateway 11 in the nonstandard protocol format, is converted into the standard protocol format and transmitted to the non-secure network 1.

By means of the security gateway processing of the above-described FIG. 4 through FIG. 7, in addition to the advantageous results of the first embodiment, the following advantageous results are further obtained.

That is, in the non-secure network gateway 11 and the secure network gateway 12, when receiving packet data from the other sub-gateway, reception of packet data is awaited, and each time packet data is received a judgment of the packet data is performed, so that only packet data for which relaying is permitted can be relayed to the destination network.

Such processing of packet data by each sub-gateway is performed by each virtual machine, which is constructed on a physical hardware unit of a single real machine to realize each sub-gateway. However, similar to when each sub-gateway is realized by a single real machine, the processing by each sub-gateway is performed separately and independently from the communication functions of the other sub-gateway, and consequently the networks are separated, so that secure data exchange between the networks can be achieved. Moreover, the secure network can be protected from security threats immanent in the non-secure network, so that security of the secure network can be enhanced.

SECOND EMBODIMENT

FIG. 10 is a configuration diagram showing the function configuration of the security gateway system of a second embodiment to which the invention is applied. As shown in FIG. 10, the security gateway system 10 of this embodiment adds, to the configuration of the first embodiment, shared memory 13, which can be accessed by the nonstandard protocol communication portions 22, 23 of the non-secure network gateway 11 and secure network gateway 12. And, the security gateway is configured such that data is exchanged by accessing the shared memory 13, without direct communication between the nonstandard protocol communication portions 22 and 23.

Figure 11:
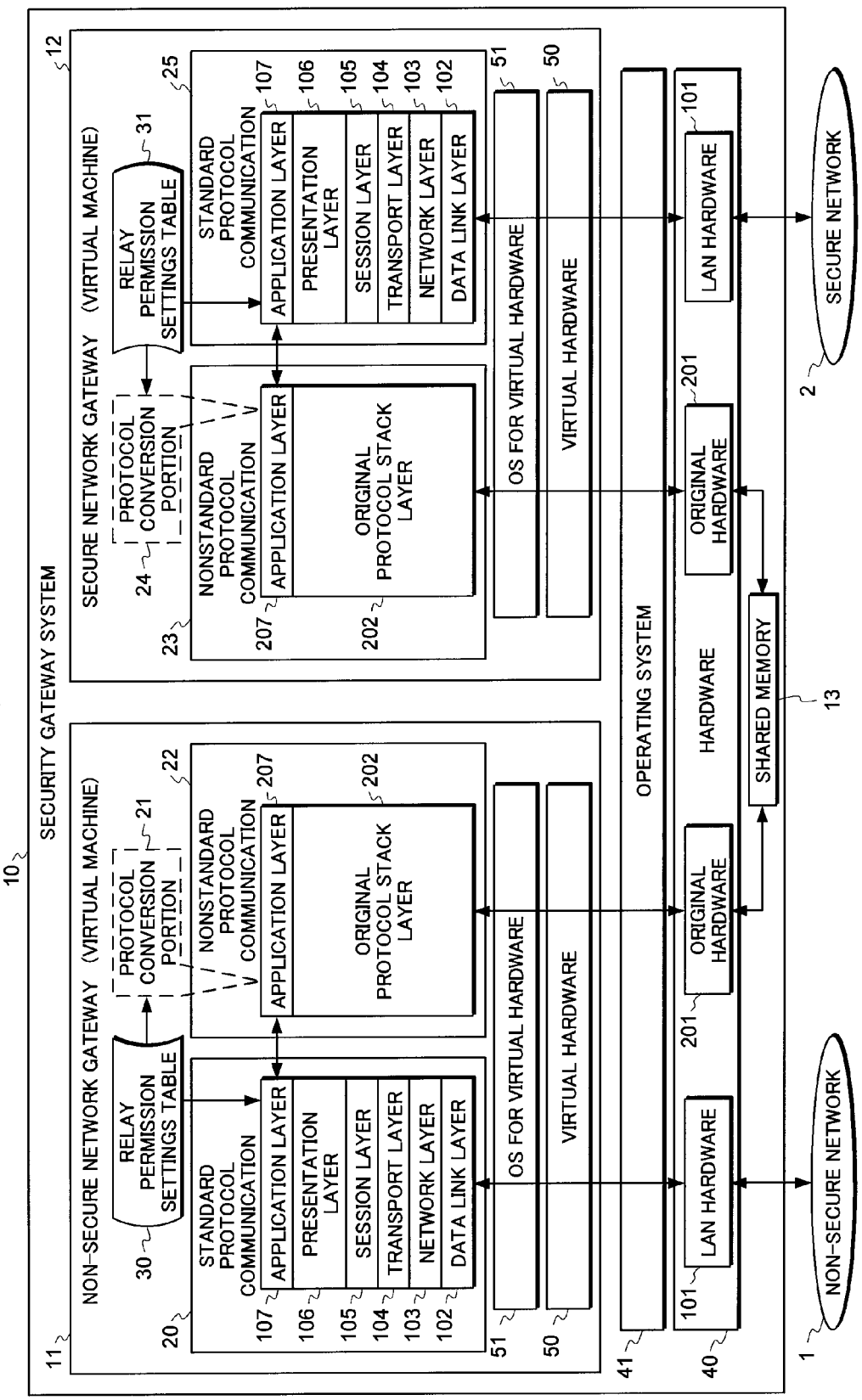
FIG. 11 is a conceptual diagram, using hardware resources and operating system resources to show the computer resource configuration of the second embodiment, and using the concept of the Open Systems Interconnection (OSI) model of communication layers to show the configuration of the standard protocol communication portions and nonstandard protocol communication portions.

FIG. 11 is a configuration diagram, using hardware resources and operating system resources to show the computer resource configuration of the security gateway system 10 shown in FIG. 10, and using the concept of the Open Systems Interconnection (OSI) model of communication layers to show the configuration of the standard protocol communication portions 20, 25 and nonstandard protocol communication portions 22, 23 in the non-secure network gateway 11 and secure network gateway 12.

As shown in FIG. 11, in the computer resource configuration of the security gateway system 10 of this embodiment, a shared memory 13 constituted of an external memory, which is independent from the physical hardware unit 30 of the real machine, is added to the computer resource configuration (FIG. 2) of the first embodiment. The other configuration is the same as that of the first embodiment.

A summary of operation of the security gateway system 10 of this embodiment, configured as described above, is shown in FIG. 3, similar to the first embodiment, but the specific data processing procedures of this embodiment are as shown in FIG. 12 through FIG. 15. That is, FIG. 12 through FIG. 15 are flowcharts showing examples of the processing procedures in this embodiment, using shared memory 13, for non-secure network gateway reception processing (S110), secure network gateway transmission processing (S120), secure network reception processing (S210), and non-secure network gateway transmission processing (S220).

Below, details of the processing procedures shown in FIG. 12 through FIG. 15 are explained in order.

Figure 12:
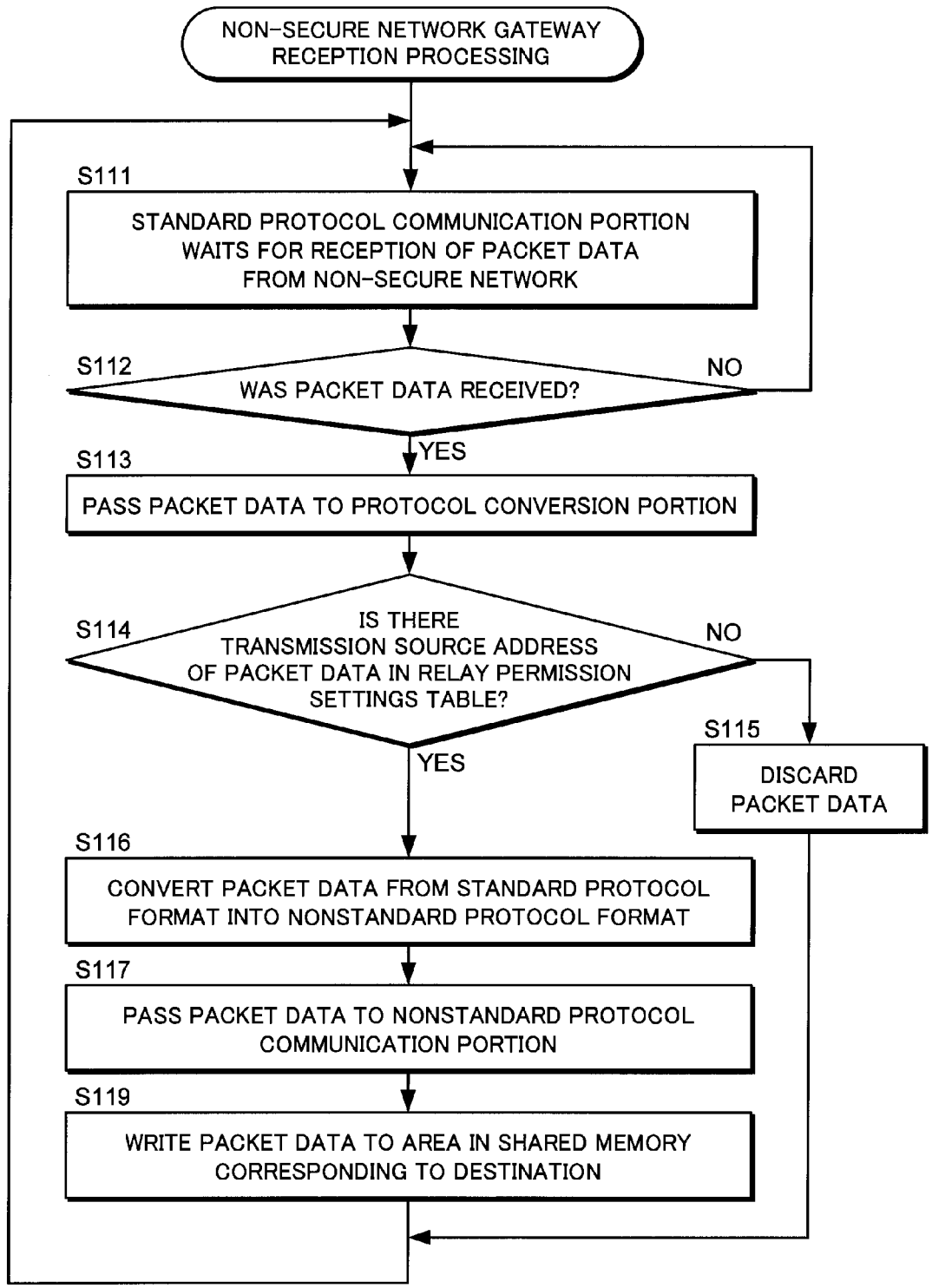
FIG. 12 is a flowchart showing an example of the processing procedure for the non-secure network gateway reception processing of the second embodiment.

As shown in FIG. 12, in the non-secure network gateway reception processing (S110) of this embodiment, the series of processing (S111 to S117) in which packet data reception by the standard protocol portion 20 of the non-secure network gateway 11 is awaited, relay permission for the transmission source of packet data is confirmed by the protocol conversion portion 21, and the packet data is either discarded or is converted to the nonstandard protocol format and passed to the nonstandard protocol communication portion 22 according to the result, is similar to the series of processing designated by the same symbols (S111 to S117) in FIG. 4.

The non-secure network gateway reception processing (S110) of this embodiment differs from the processing shown in FIG. 4 in that the nonstandard protocol communication portion 22 does not transmit received packet data, in the nonstandard protocol format, to the secure network gateway 12, but instead writes the packet data to shared memory 13 (S119). That is, in this processing (S119), the nonstandard protocol communication portion 22 refers to the destination permission information in the relay permission settings table 30, and writes packet data to an area in shared memory 13 corresponding to the destination.

Figure 13:
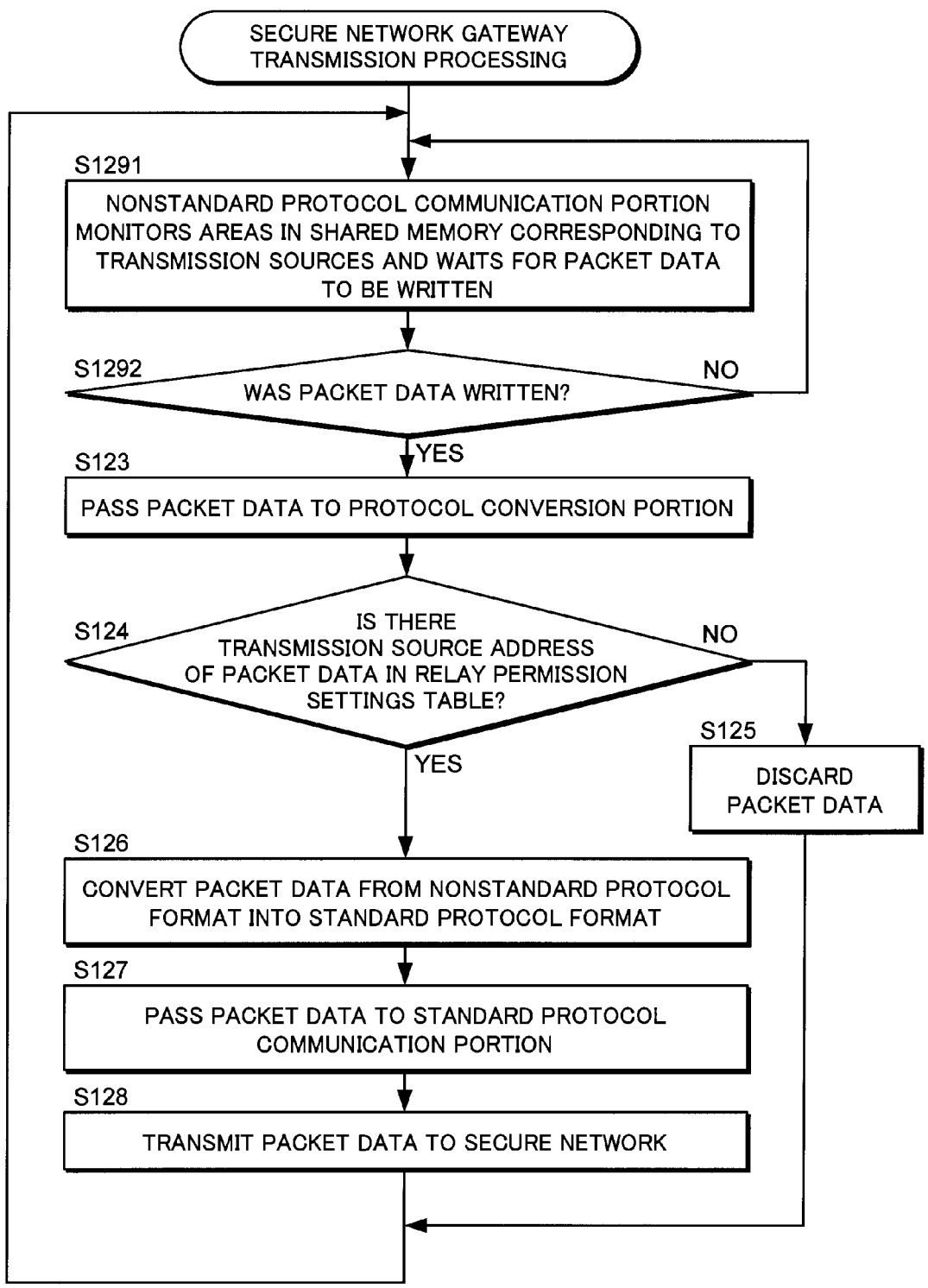
FIG. 13 is a flowchart showing an example of the processing procedure for the secure network gateway transmission processing of the second embodiment.

As shown in FIG. 13, in the secure network gateway transmission processing (S120) of this embodiment, the nonstandard protocol communication portion 23 of the secure network gateway 12 refers to the relay permission settings table 31 in the secure network gateway 12, monitors the areas corresponding to transmission source in the shared memory 13 according to the transmission sources permission information, monitors the writing of packet data, and waits for packet data to be written (S1291). The nonstandard protocol communication portion 23, upon detecting writing of packet data to the shared memory 13 (S1292) by the nonstandard protocol communication portion 22 of the non-secure network gateway 11, passes the packet data to the protocol conversion portion 24 (S123).

In the secure network gateway transmission processing (S120) of this embodiment, the series of processing (S124 to S128) in which the protocol conversion portion 24 confirms the relay permission for the transmission source of packet data, either discards the packet data or converts the data to the standard protocol format and passes the data to the standard protocol communication portion 25, is similar to the series of processing denoted by the same symbols (S124 to S128) shown in FIG. 5.

Figure 14:
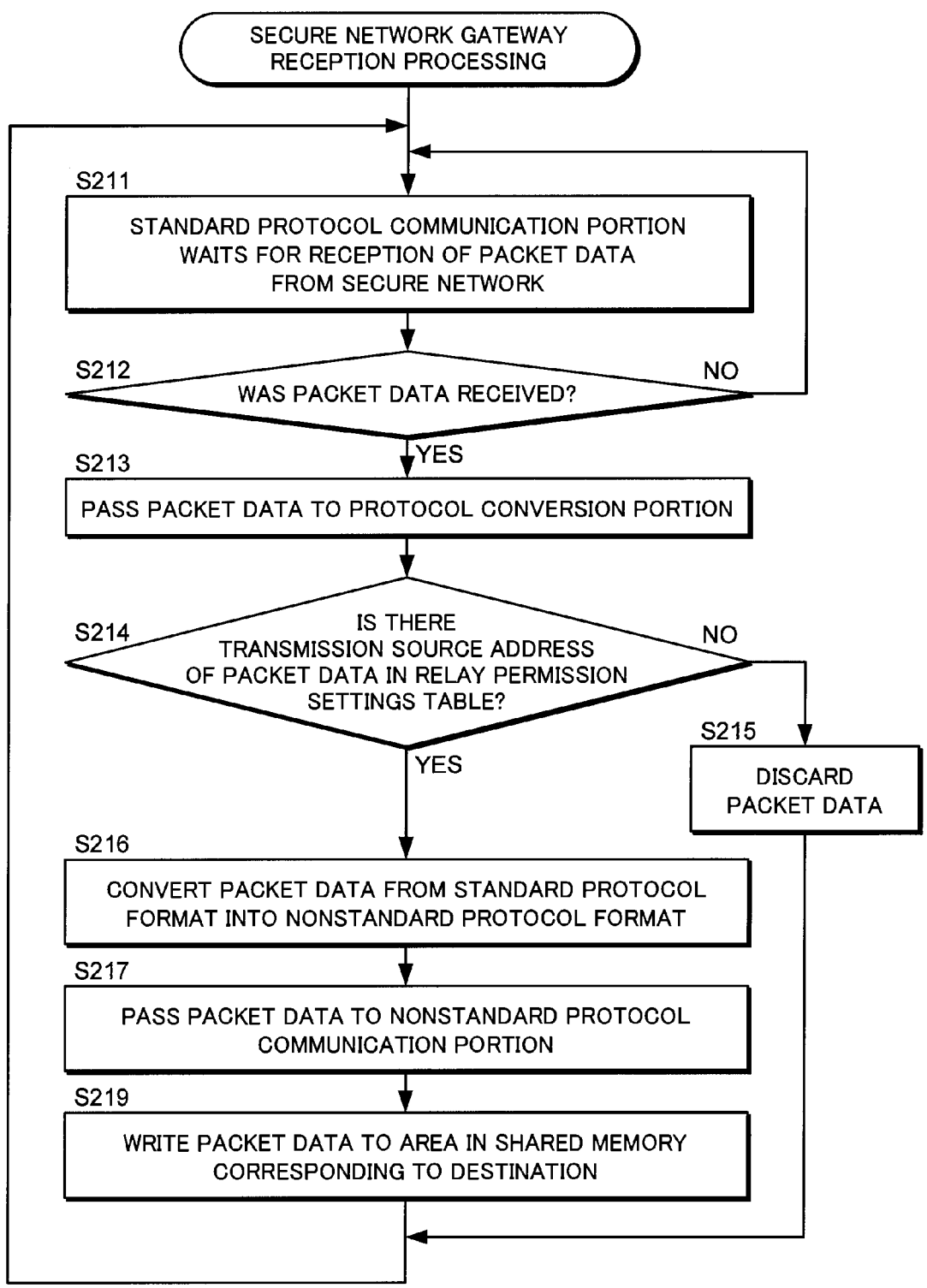
FIG. 14 is a flowchart showing an example of the processing procedure for the secure network gateway reception processing of the second embodiment.

As shown in FIG. 14, in the secure network gateway reception processing (S210) of this embodiment, the series of processing (S211 to S217) in which the standard protocol communication portion 25 of the secure network gateway 12 waits for packet data reception, and the protocol conversion portion 24 confirms relay permission for the packet data transmission source and either discards the packet data or converts the data to the nonstandard protocol format and passes the data to the nonstandard protocol communication portion 23, is similar to the series of processing denoted by the same symbols (S211 to S217) in FIG. 6.

The secure network gateway reception processing (S210) of this embodiment differs from the processing shown in FIG. 6 in that the nonstandard protocol communication portion 23 does not transmit the received packet data in nonstandard protocol format to the non-secure network gateway 11, but instead writes the data to shared memory 13 (S219). That is, in this processing (S219), the nonstandard protocol communication portion 23 refers to the destination permission information in the relay permission settings table 31, and writes the packet data to the corresponding area in shared memory 13 according to the destination.

Figure 15:
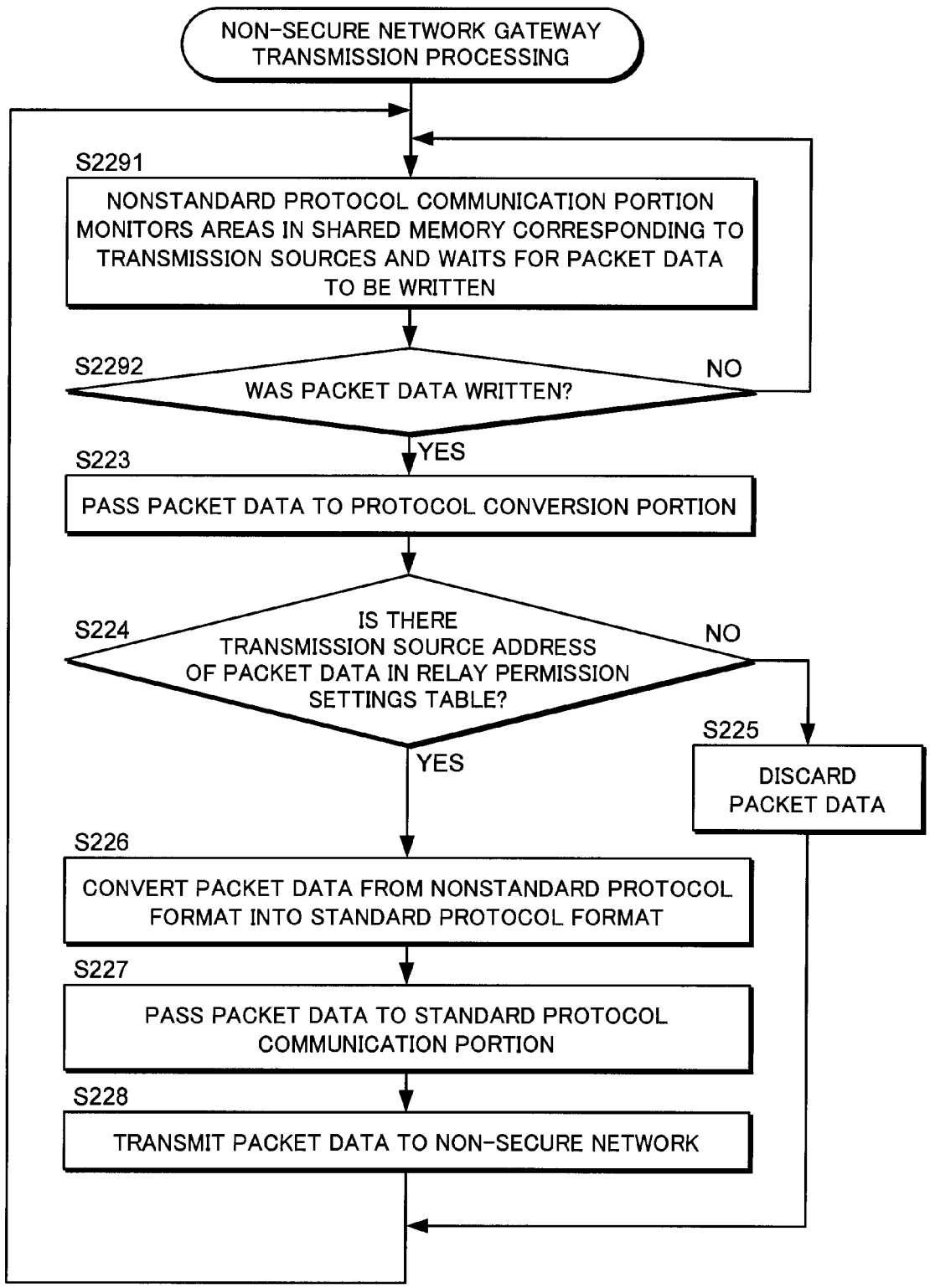
FIG. 15 is a flowchart showing an example of the processing procedure for the non-secure network gateway transmission processing of the second embodiment.

As shown in FIG. 15, in the non-secure network gateway transmission processing (S220) of this embodiment, the nonstandard protocol communication portion 22 of the non-secure network gateway 11 refers to the relay permission settings table 30 in the non-secure network gateway 11, monitors the areas in shared memory 13 corresponding to transmission sources according to the transmission source information, monitors the writing of packet data, and waits for packet data writing (S2291). The nonstandard protocol communication portion 22, upon detecting writing of packet data to the shared memory 13 (S2292) by the nonstandard protocol communication portion 23 of the secure network gateway 12, passes the packet data to the protocol conversion portion 21 (S223).

In the non-secure network gateway transmission processing (S220) of this embodiment, the series of processing (S224 to S228) in which the protocol conversion portion 21 confirms relay permission for the transmission source of packet data, and either discards the packet data or converts the data to the standard protocol format and passes the data to the standard protocol communication portion 20 according to the result, is similar to the series of processing denoted by the same symbols (S224 to S228) in FIG. 7.

By means of the security gateway system of the second embodiment described above, in addition to the advantageous results of the first embodiment, the following advantageous results are further obtained.

That is, in the non-secure network gateway 11 and the secure network gateway 12, packet data is exchanged by accessing the shared memory, without direct communication between the sub-gateways, so there exist no connections with communication functions at all between the sub-gateways, and consequently the networks are completely separated, so that secure data exchange between the networks can be achieved. Hence the secure network can be protected from security threats immanent in the non-secure network, and security of the secure network can be enhanced.

THIRD EMBODIMENT

Figure 16:
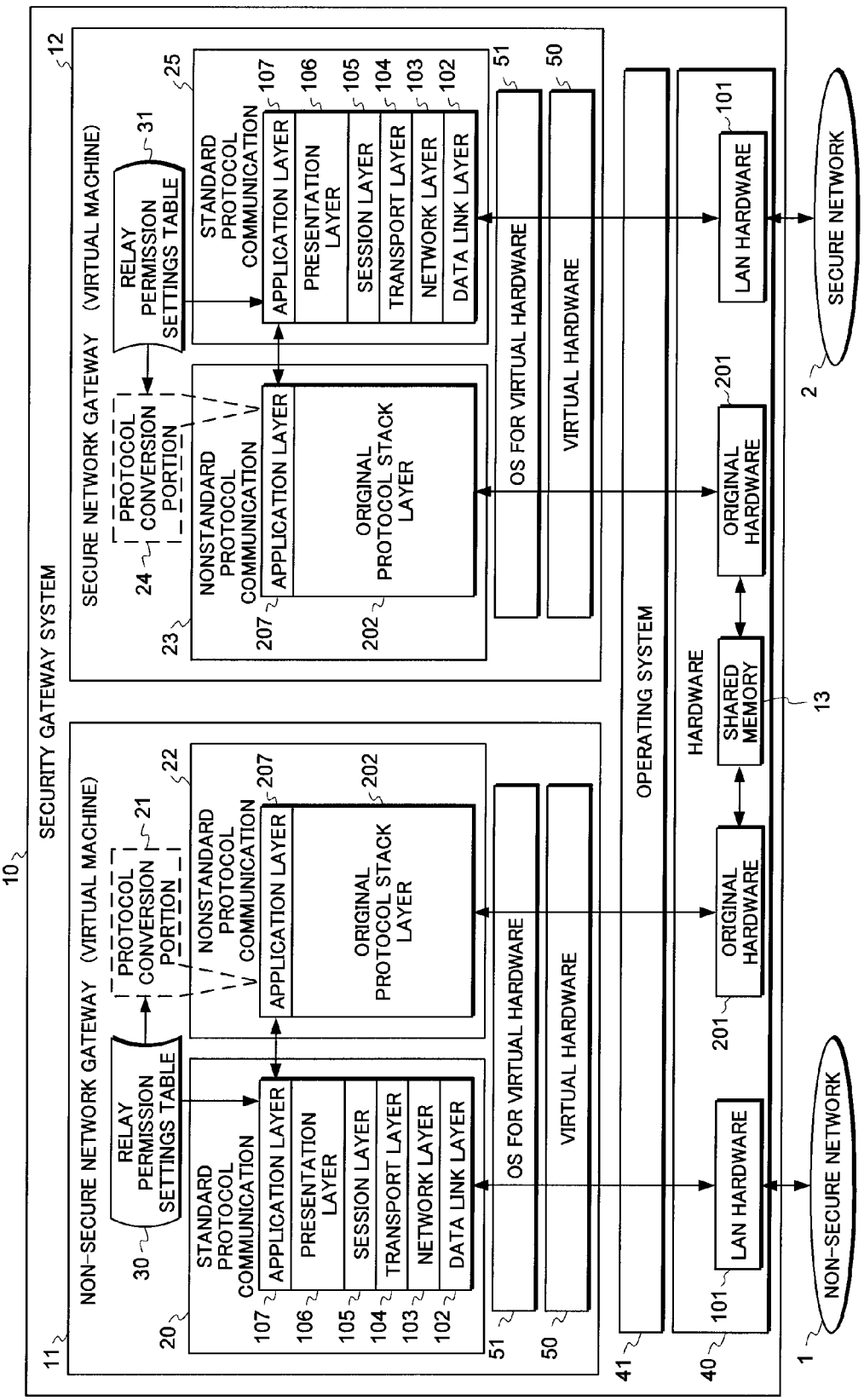
FIG. 16 is a conceptual diagram, using hardware resources and operating system resources to show the computer resource configuration of the security gateway system of a third embodiment to which the invention is applied, and using the concept of the Open Systems Interconnection (OSI) model of communication layers to show the configuration of the standard protocol communication portions and nonstandard protocol communication portions.

FIG. 16 is a configuration diagram, using hardware resources and operating system resources to show the computer resource configuration of the security gateway system of a third embodiment to which the invention is applied, and using the concept of the Open Systems Interconnection (OSI) model of communication layers to show the configuration of the standard protocol communication portions 20, 25 and nonstandard protocol communication portions 22, 23 in the non-secure network gateway 11 and secure network gateway 12.

As shown in FIG. 16, the computer resource configuration of the security gateway system 10 of this embodiment is configured such that only the configuration of the shared memory 13 is changed in the computer resource configuration (FIG. 11) of the second embodiment. That is, in this embodiment, the shared memory 13 is realized by using a part of the storage area of a memory which is essentially included in the physical hardware unit 40 of a real machine. The other configuration is the same as that of the first embodiment. Further, the function configuration of the security gateway system 10 of this embodiment is the same as that (FIG. 10) of the second embodiment.

A summary of operation of the security gateway system 10 of this embodiment, configured as described above, is shown in FIG. 3, similar to the first and second embodiments, and the specific data processing procedures of this embodiment is the same as that (FIG. 12 through FIG. 15) of the second embodiment.

By means of the security gateway system of the third embodiment, in addition to the advantageous results of the first and second embodiments, the following advantageous results are further obtained.

That is, the shared memory is realized by using a part of the storage area of a memory which is essentially included in the physical hardware unit of a real machine constituting the system, so the physical hardware configuration of the total system is more simplified by using not any independent external memory, as a result, economic effect is more improved.

FOURTH EMBODIMENT

Figure 17:
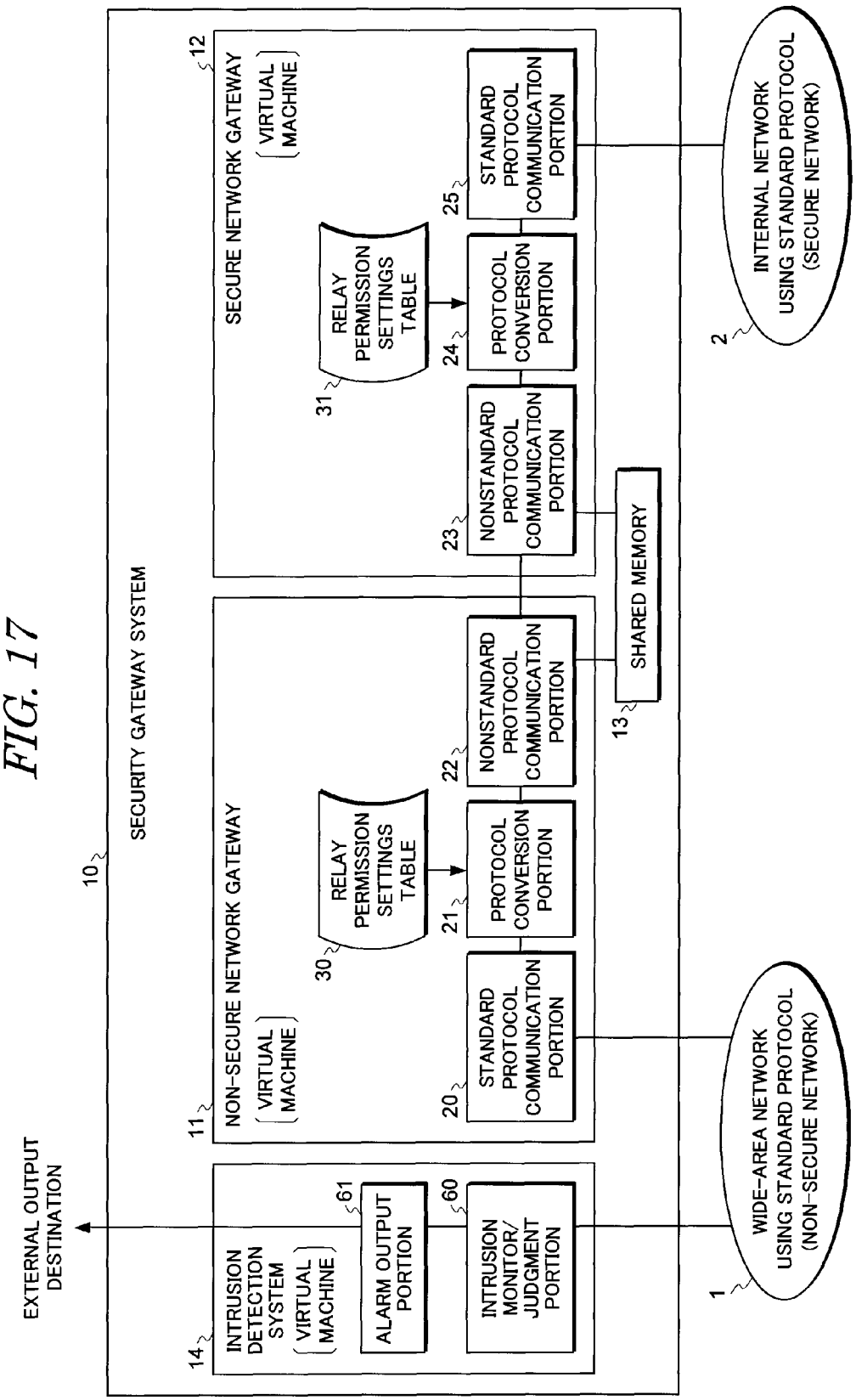
FIG. 17 is a configuration diagram showing the function configuration of the security gateway system of a fourth embodiment to which the invention is applied.

FIG. 17 is a configuration diagram showing the function configuration of the security gateway system of a fourth embodiment to which the invention is applied. As shown in FIG. 17, in the computer resource configuration of the security gateway system 10 of this embodiment, an intrusion detection system 14 which detects an intrusion from the non-secure network 1, is added to the configuration of the third embodiment.

The intrusion detection system 14 is constituted of an intrusion monitor/judgment portion 60, which monitors packet data flowed from the non-secure network 1 into the non-secure network gateway 11 and judges as to whether there is an intrusion, and an alarm output portion 61, which outputs an alarm signal when detecting an intrusion. Further, the intrusion detection system 14, as shown in FIG. 18, is realized as a virtual machine similar to the non-secure network gateway 11 and secure network gateway 12.

Figure 18:
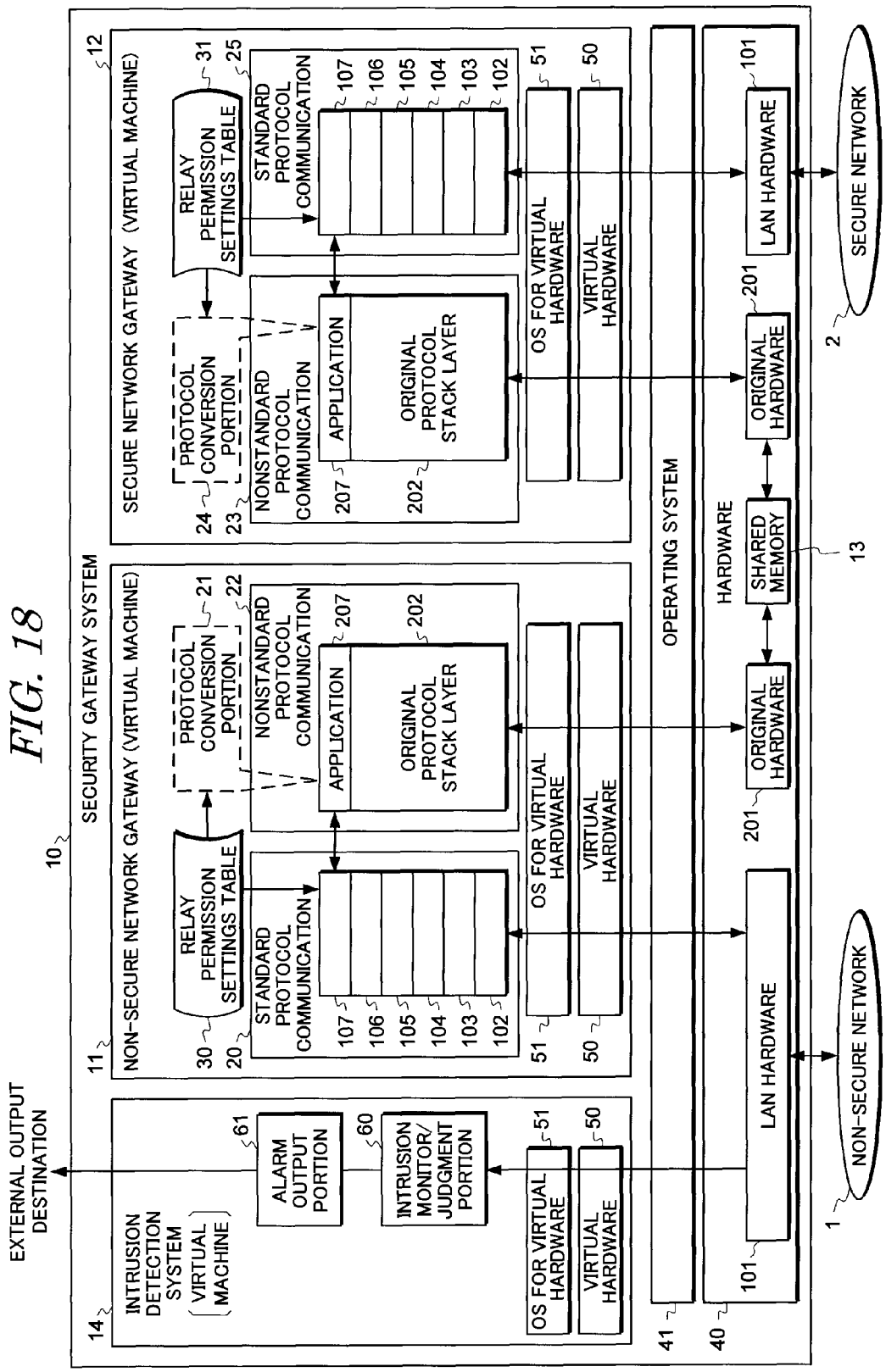
FIG. 18 is a conceptual diagram, using hardware resources and operating system resources to show the computer resource configuration of the fourth embodiment, and using the concept of the Open Systems Interconnection (OSI) model of communication layers to show the configuration of the standard protocol communication portions and nonstandard protocol communication portions.

Here, FIG. 18 is a configuration diagram, using hardware resources and operating system resources to show the computer resource configuration of the security gateway system 10 shown in FIG. 17, and using the concept of the Open Systems Interconnection (OSI) model of communication layers to show the configuration of the standard protocol communication portions 20, 25 and nonstandard protocol communication portions 22, 23 in the non-secure network gateway 11 and secure network gateway 12.

As shown in FIG. 18, in the security gateway system 10 of this embodiment, the intrusion detection system 14 is a virtual machine which is constituted of a virtual hardware unit 50 constructed on a physical hardware unit 40 of the real machine of the security gateway system 10 and an operating system (OS) for virtual hardware 51 working on the virtual hardware unit 50. The intrusion monitor/judgment portion 60 and alarm output portion 61 are configured inside the virtual machine which constitutes the intrusion detection system 14.

Here, the virtual machine which constitutes such intrusion detection system 14, can be readily realized by the existing virtualization technology as described above, similar to the virtual machines which constitutes the non-secure network gateway 11 and secure network gateway 12. Further, the intrusion monitor/judgment portion 60 and alarm output portion 61, can be readily realized by using various existing techniques concerned with intrusion detection system.

A summary of operation of the security gateway system 10 of this embodiment, configured as described above, is shown in FIG. 3, similar to the first, second and third embodiments, and the specific data processing procedures of this embodiment is the same as that (FIG. 12 through FIG. 15) of the second and third embodiments. In addition to such operation, in this embodiment, by the intrusion detection system 14, monitoring of intrusion from the non-secure network gateway 11 is constantly performed, and an alarm signal is outputted when an intrusion is detected.

That is, the intrusion monitor/judgment portion 60 of the intrusion detection system 14 constantly monitors packet data flowed from the non-secure network 1 into the non-secure network gateway 11 and judges as to whether there is an intrusion. When an intrusion is detected by the intrusion monitor/judgment portion 60, an alarm signal that indicates an intrusion is outputted to an external output destination set in advance by the alarm output portion 61. Here, the output destination set in advance as external output destination may be, for example, an external display device, computer system or terminal of a responsible person, and the like.

By means of the security gateway system of the fourth embodiment, in addition to the advantageous results of the first, second and third embodiments, the following advantageous results are further obtained.

That is, by constantly monitoring the contents of packet data flowed from the non-secure network into the non-secure network gateway, when there is an intrusion from the non-secure network, the intrusion is surely detected and responsible persons can be notified of the intrusion. As a result, the responsible persons can appropriately and promptly take measures when occurring of an intrusion.

Consequently, the secure network can be protected more surely from security threats immanent in the non-secure network, so that security of the secure network can be more enhanced, as a result, security and reliability of the security gateway system can be more enhanced. Moreover, the intrusion detection system realized by virtual machine, does not need costs of specialized hardware unit or the other unit for detecting intrusion, as a result, excellent economic effect is obtained.

FIFTH EMBODIMENT

Figure 19:
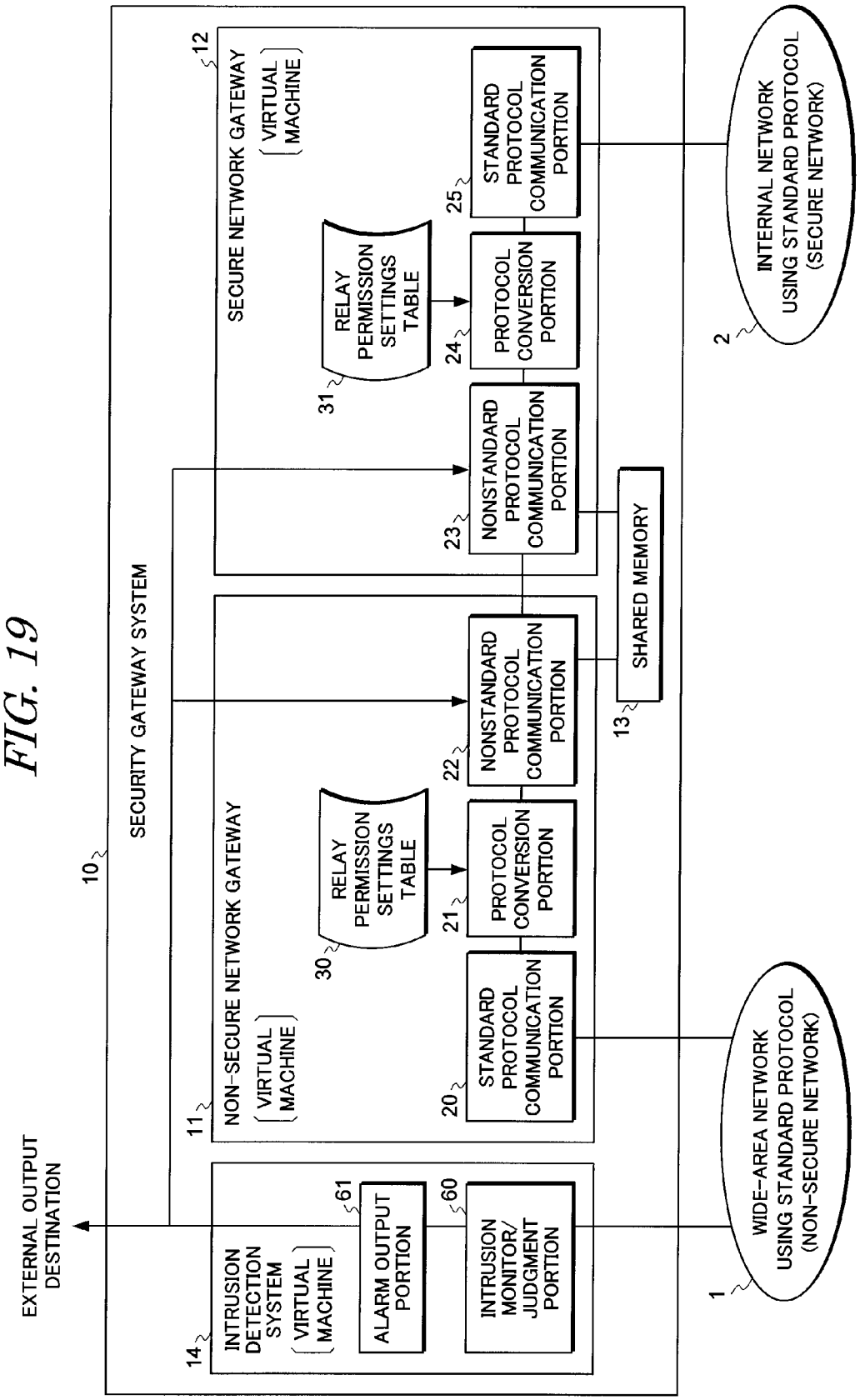
FIG. 19 is a configuration diagram showing the function configuration of the security gateway system of a fifth embodiment to which the invention is applied.

FIG. 19 is a configuration diagram showing the function configuration of the security gateway system of a fifth embodiment to which the invention is applied. As shown in FIG. 19, in the security gateway system 10 of this embodiment, the intrusion detection system 14 is the same as that of the fourth embodiment, but an alarm signal from the intrusion detection system 14, is outputted not only to the external output destination, but also to each of the nonstandard protocol communication portions 22, 23 in the non-secure network gateway 11 and secure network gateway 12.

Figure 20:
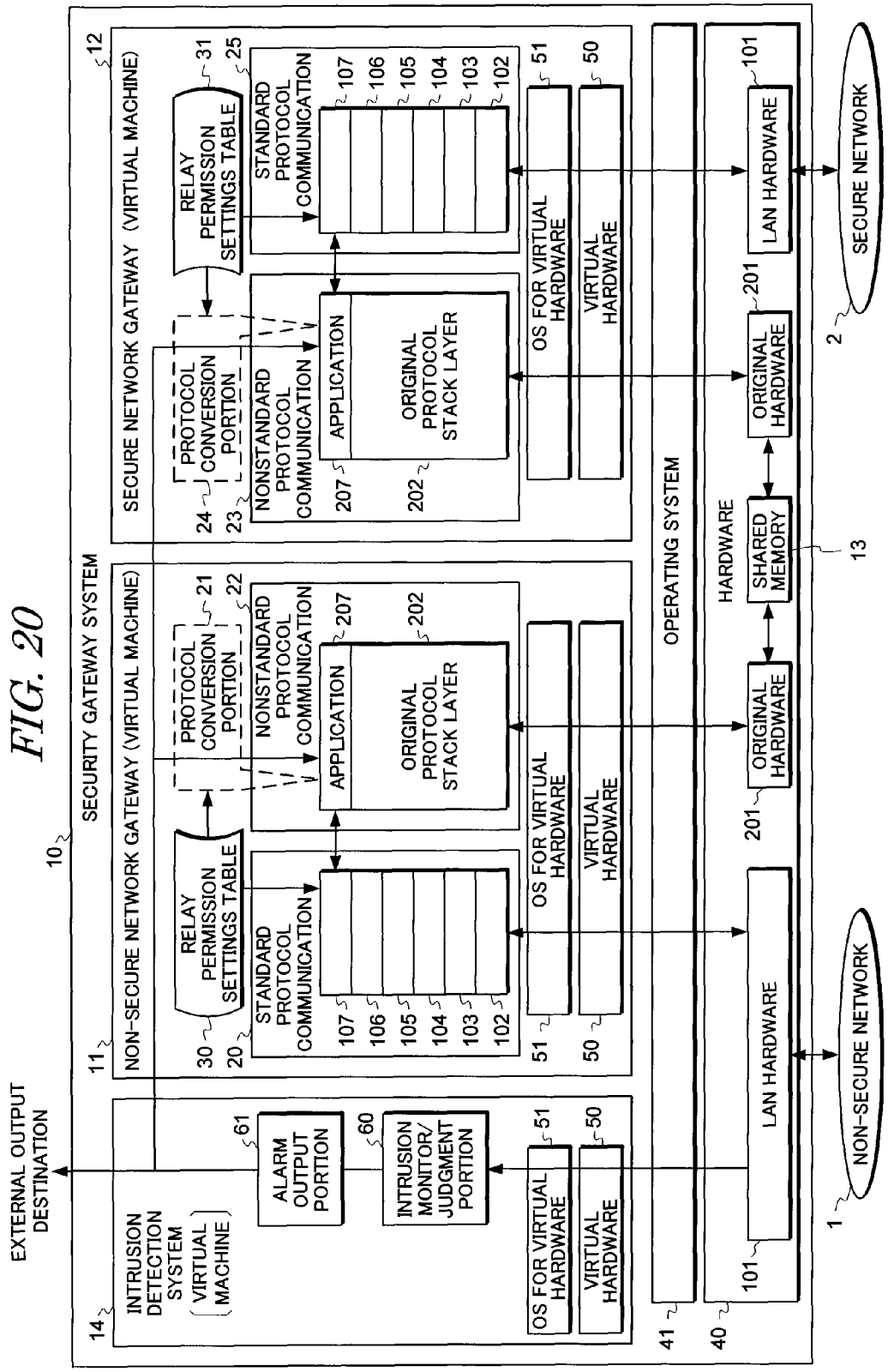
FIG. 20 is a conceptual diagram, using hardware resources and operating system resources to show the computer resource configuration of the fifth embodiment, and using the concept of the Open Systems Interconnection (OSI) model of communication layers to show the configuration of the standard protocol communication portions and nonstandard protocol communication portions.

FIG. 20 is a configuration diagram, using hardware resources and operating system resources to show the computer resource configuration of the security gateway system 10 shown in FIG. 19, and using the concept of the Open Systems Interconnection (OSI) model of communication layers to show the configuration of the standard protocol communication portions 20, 25 and nonstandard protocol communication portions 22, 23 in the non-secure network gateway 11 and secure network gateway 12.

As shown in FIG. 20, in this embodiment, an alarm signal from the alarm output portion 61 of the intrusion detection system 14, is not only outputted to the external output destination which is the same as that of the fourth embodiment, but also outputted to each application layer 207 in each of the nonstandard protocol communication portions 22, 23 in the non-secure network gateway 11 and secure network gateway 12. The other configuration is the same as that of the fourth embodiment.

In the security gateway system 10 of this embodiment, by the intrusion detection system 14, monitoring of intrusion from the non-secure network gateway 11 is constantly performed, and an alarm signal is outputted when an intrusion is detected. This operation is the same of that of the fourth embodiment, but in this embodiment, the output destination is different from that of the fourth embodiment.

That is, in this embodiment, when an intrusion is detected, an alarm signal from the alarm output portion 61, is outputted to each application layer 207, which is the upper layer of each original protocol stack layer 202 in each of the nonstandard protocol communication portions 22, 23 in the non-secure network gateway 11 and secure network gateway 12, as well as the external destinations such as an external display device, computer system or terminal of a responsible person.

In each of the nonstandard protocol communication portions 22, 23, when each application layer 207 receives an alarm signal, immediately after this reception, it stops data relay processing between the non-secure network gateway 11 and secure network gateway 12. That is, access to the shared memory 13 from each application layer 207 in each of the nonstandard protocol communication portions 22, 23, is stopped simultaneously, as a result, the data relay processing intervened by the shared memory 13 is stopped.

By means of the security gateway system of the fifth embodiment, in addition to the advantageous results of the first through fourth embodiments, the following advantageous results are further obtained.

That is, when there is an intrusion from the non-secure network, the intrusion is surely detected to automatically and immediately stop the data relay processing between the sub-gateways. Consequently, even if responsible persons cannot immediately take measures to the intrusion, security measures can be taken automatically and surely. As a result, the secure network can be protected more surely from security threats immanent in the non-secure network, so that security of the secure network can be more enhanced.

Further, as a modification of this embodiment, an alarm signal from the alarm output portion 61, is outputted to not both of the non-secure network gateway and secure network gateway 12, but to only the nonstandard protocol communication portion 23 of the secure network gateway 12. In this case, when receiving an alarm signal, access to the shared memory 13 from the nonstandard protocol communication portion 23, is stopped, as a result, the data relay processing is stopped.

Further, as another modification, an alarm signal from the alarm output portion 61, is not outputted to the outside, but outputted to only the nonstandard protocol communication portions 22, 23 of the non-secure network gateway 11 and secure network gateway 12, or outputted to only the nonstandard protocol communication portion 23 of the secure network gateway 12.

OTHER EMBODIMENTS

This invention is not limited to the above-described embodiments and modified examples, and various other modified examples can be carried out within the scope of the invention. For example, appropriate combinations of the above-described plurality of embodiments and modified examples are possible.

Further, the configuration and procedure of processing of the security gateway systems and sub-gateways comprised thereby are merely examples, and so long as two sub-gateways, which are realized by virtual machines constructed on a physical hardware unit and connected to two networks, and which exchange data between the sub-gateways using a nonstandard protocol, and use only the application layer for data exchange between the nonstandard side and the standard side in the sub-gateways, the specific configuration and processing procedure can be freely modified.

The invention claimed is:

1. A security gateway system for connecting a plurality of networks each of which uses a standard protocol the standardized specifications of which have been published, wherein the security gateway system comprises:

two sub-gateways individually realized as virtual machines each of which is constituted of a virtual hardware unit constructed on a physical hardware unit of a real machine and an operating system working on the virtual hardware unit, and the two sub-gateways being individually connected to two networks to be connected, wherein:

each of said sub-gateways has a standard protocol communication portion which communicates with said network to which the same sub-gateway is connected using said standard protocol, a nonstandard protocol communication portion which communicates with the other sub-gateway using a nonstandard protocol the specifications of which have not been published, a protocol conversion portion which performs protocol conversion of communication data between the standard protocol and the nonstandard protocol, and a relay permission setting information storage portion which stores relay permission setting information used to confirm relay permission for communication data;

said two sub-gateways are configured such that data can be exchanged between the nonstandard protocol communication portions using said nonstandard protocol;

said nonstandard protocol communication portion of each of said sub-gateways is an original communication portion which has an implemented application layer which is a seventh layer of the Open Systems Interconnection (OSI) model, and which has unpublished and original communication layers implemented for the range corresponding to first through sixth layers, so that data exchange between the nonstandard protocol communication portion and said standard protocol communication portion within the same sub-gateway is performed only in the application layer which is the seventh layer, and data exchange is not possible in the range corresponding to the first through sixth layers; and when performing protocol conversion of communication data, said protocol conversion portion of each of said sub-gateways refers to said relay permission setting information to confirm relay permission for the communication data, and performs protocol conversion of the communication data only when relay is permitted, wherein:

the standard protocol communication portion of each of said sub-gateways, is constituted of two parts which are individually constructed by individual construction methods different from each other, such that the first layer part is realized by a physical hardware unit for standard communication which is added to said physical hardware unit, and such that a part of the second through seventh layers is realized by said virtual machine, the nonstandard protocol communication portion of each of said sub-gateways, is constituted of two parts which are individually constructed by individual construction methods different from each other, such that the first layer part is realized by a physical hardware unit having an original configuration for original communication which is added to said physical hardware unit, and such that a part of the second through seventh layers is realized by said virtual machine.

2. The security gateway system according to claim 1, wherein said standard protocol communication portion of each of said sub-gateways waits for reception of packet data from said network to which the same sub-gateway is connected, and each time packet data is received, passes the packet data to said protocol conversion portion of the same sub-gateway;

said nonstandard protocol communication portion of each of said sub-gateways waits for reception of packet data from the other sub-gateway, and each time packet data is received, passes the packet data to said protocol conversion portion of the same sub-gateway; and said protocol conversion portion of each of said sub-gateways, upon receiving packet data from either said standard protocol communication portion or from said nonstandard protocol communication portion in the same sub-gateway, confirms relay permission for the packet data by referring to said relay permission setting information, and if relaying of the packet data is not permitted, discards the packet data.

3. The security gateway system according to claim 1, wherein said two sub-gateways have shared memory which can be accessed by the respective nonstandard protocol communication portion of each of said sub-gateways, and are configured such that data can be exchanged between the nonstandard protocol communication portions by accessing the shared memory using said nonstandard protocol, without performing direct communication between the nonstandard protocol communication portions.

4. The security gateway system according to claim 3, wherein said shared memory is an external memory which is independent from the physical hardware unit of said real machine.

5. The security gateway system according to claim 3, wherein said shared memory is a virtual memory which is constructed on the physical hardware unit of said real machine.

6. The security gateway system according to claim 1, wherein said two sub-gateways are a non-secure network gateway and a secure network gateway, connected to a non-secure network to which numerous unspecified people are connected and to a secure network the security of which is required to be maintained, individually, an intrusion detection system which detects an intrusion from said non-secure network is connected to the non-secure network, wherein the intrusion detection system is realized as virtual machines each of which is constituted of a virtual hardware unit constructed on the physical hardware unit of said real machine and an operating system working on the virtual hardware unit.

7. The security gateway system according to claim 6, wherein said intrusion detection system detects an intrusion from said non-secure network, the intrusion detection system outputs a signal that indicates the detection of the intrusion outside the security gateway system.

8. The security gateway system according to claim 6, wherein said intrusion detection system detects an intrusion from said non-secure network, intrusion detection system outputs a signal that indicates the detection of the intrusion to the application layer on the original communication layers of each of said sub-gateways resulting in that relay processing of communication data corresponding to the intrusion is stopped.

9. A security gateway method for connecting a plurality of networks each of which uses a standard protocol the standardized specifications of which have been published, wherein the security gateway method uses:

two sub-gateways individually realized as virtual machines each of which is constituted of a virtual hardware unit constructed on a physical hardware unit of a real machine and an operating system working on the virtual hardware unit, and the two sub-gateways being individually connected to two networks to be connected, wherein:

each of said sub-gateways has a standard protocol communication portion which communicates with said network to which the same sub-gateway is connected using said standard protocol, a nonstandard protocol communication portion which communicates with the other sub-gateway using a nonstandard protocol the specifications of which have not been published, a protocol conversion portion which performs protocol conversion of communication data between the standard protocol and the nonstandard protocol, and a relay permission setting information storage portion which stores relay permission setting information used to confirm relay permission for communication data, the standard protocol communication portion of each of said sub-gateways, is constituted of two parts which are individually constructed by individual construction methods different from each other, such that from the viewpoint of the Open Systems Interconnection (OSI) model, the first layer part is realized by a physical hardware unit for standard communication which is added to said physical hardware unit, and such that a part of the second through seventh layers is realized by said virtual machine, the nonstandard protocol communication portion of each of said sub-gateways, is constituted of two parts which are individually constructed by individual construction methods different from each other, such that the first layer part is realized by a physical hardware unit having an original configuration for original communication which is added to said physical hardware unit, and such that a part of the second through seventh layers is realized by said virtual machine, and the security gateway method comprises the steps of:

performing gateway-to-gateway communication processing, in said nonstandard protocol communication portions of said two sub-gateways, to exchange data between the nonstandard protocol communication portions using said nonstandard protocol;

performing intra-gateway communication processing to exchange data between said nonstandard protocol communication portion and said standard protocol communication portion in each of said sub-gateways using only a seventh or application layer of the Open Systems Interconnection (OSI) model, forbidding data exchange within the range from a first layer to a sixth layer; and performing relay permission confirmation and protocol conversion processing to, when performing protocol conversion of communication data in said protocol conversion portion of each of said sub-gateways, confirm relay permission for the communication data by referring to said relay permission setting information, and to perform protocol conversion of the communication data only when relaying is permitted.

10. A non-transitory computer readable medium storing a security gateway program for realizing two sub-gateways individually connected to two networks to be connected using mutually independent computers, to connect a plurality of networks each of which uses a standard protocol the standardized specifications of which have been published, wherein
when said two sub-gateways are individually realized as virtual machines each of which is constituted of a virtual hardware unit constructed on a physical hardware unit of a real machine and an operating system working on the virtual hardware unit, and the two sub-gateways being individually connected to two networks to be connected, wherein:
each of said sub-gateways has a standard protocol communication portion which uses said standard protocol to communicate with said network connected to the same sub-gateway, a nonstandard protocol communication portion which uses a nonstandard protocol the specifications of which have not been published to communicate with the other sub-gateway, a protocol conversion portion which performs protocol conversion of communication data between the standard protocol and the nonstandard protocol, and a relay permission setting information storage portion which stores relay permission setting information used to confirm relay permission for communication data,
the standard protocol communication portion of each of said sub-gateways, is constituted of two parts which are individually constructed by individual construction methods different from each other, such that from the viewpoint of the Open Systems Interconnection (OSI) model, the first layer part is realized by a physical hardware unit for standard communication which is added to said physical hardware unit, and such that a part of the second through seventh layers is realized by said virtual machine,
the nonstandard protocol communication portion of each of said sub-gateways, is constituted of two parts which are individually constructed by individual construction methods different from each other, such that the first layer part is realized by a physical hardware unit having an original configuration for original communication which is added to said physical hardware unit, and such that a part of the second through seventh layers is realized by said virtual machine, and
said security gateway program causes said computers to execute:
a gateway-to-gateway communication function, in said nonstandard protocol communication portions of said two sub-gateways, to exchange data between the nonstandard protocol communication portions using said nonstandard protocol;
an intra-gateway communication function to exchange data between said nonstandard protocol communication portion and said standard protocol communication portion in each of said sub-gateways using only a seventh or application layer of the Open Systems Interconnection (OSI) model, forbidding data exchange within the range from a first layer to a sixth layer; and
a relay permission confirmation and protocol conversion function to, when performing protocol conversion of communication data in said protocol conversion portion of each of said sub-gateways, confirm relay permission for the communication data by referring to said relay permission setting information, and to perform protocol conversion of the communication data only when relaying is permitted.

* * * * *